US008794116B2

(12) United States Patent
Tamura et al.

(10) Patent No.: US 8,794,116 B2
(45) Date of Patent: Aug. 5, 2014

(54) PERFORATING APPARATUS, SHEET PROCESSING APPARATUS, AND IMAGE FORMING APPARATUS

(75) Inventors: Masahiro Tamura, Tokyo (JP); Nobuyoshi Suzuki, Tokyo (JP); Shuuya Nagasako, Ebina (JP); Tomoichi Nomura, Nogoya (JP); Hiroshi Maeda, Nagoya (JP); Kazuhiro Kobayashi, Kawasaki (JP); Shohichi Satoh, Yokohama (JP); Akira Kunieda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 795 days.

(21) Appl. No.: 11/510,630

(22) Filed: Aug. 28, 2006

(65) Prior Publication Data

US 2007/0051219 A1 Mar. 8, 2007

(30) Foreign Application Priority Data

Aug. 29, 2005 (JP) ................................ 2005-248093

(51) Int. Cl.
*B23Q 15/00* (2006.01)
*B26D 5/00* (2006.01)

(52) U.S. Cl.
USPC .................. 83/74; 83/72; 83/679; 83/698.11; 40/621; 225/2; 225/93

(58) Field of Classification Search
USPC .................. 83/338, 679, 681, 698.11, 72, 74; 101/93.07; 156/268, 353, 227; 400/621; 225/1-5, 93
See application file for complete search history.

(56) References Cited

U.S. PATENT DOCUMENTS

| | | | | |
|---|---|---|---|---|
| 2,028,727 | A * | 1/1936 | Perry et al. | 29/26 R |
| 3,452,632 | A * | 7/1969 | Brolund | 83/549 |
| 5,746,162 | A | 5/1998 | Hosoi et al. | |
| 6,145,825 | A | 11/2000 | Kunihiro | |
| 6,164,854 | A * | 12/2000 | Otsuki | 400/621 |

(Continued)

FOREIGN PATENT DOCUMENTS

| | | |
|---|---|---|
| JP | 11-255416 | 9/1999 |
| JP | 2002128385 | 5/2002 |

(Continued)

OTHER PUBLICATIONS

Chinese Office Action and English translation thereof.

(Continued)

*Primary Examiner* — Phong Nguyen
(74) *Attorney, Agent, or Firm* — Harness, Dickey & Pierce, P.L.C.

(57) ABSTRACT

A perforating apparatus having an orientation correction device that corrects skewing and aligns the front edge by striking the front edge of the paper, a perforation device having a punch to conduct perforation processing on the paper; and a lateral registration adjustment device that can adjust, in a direction at a right angle to the direction of movement of the aforementioned paper, the position of the perforation device punch in relation to the paper with orientation corrected using an orientation constraint device prior to perforating by the perforation device. The perforating apparatus may also include a structure in which said perforation device can be inserted into and detached from a non-moving support unit having the drive source of a lateral registration adjustment device, and when mounted, the type of perforation device can be recognized.

19 Claims, 38 Drawing Sheets

(56) References Cited

U.S. PATENT DOCUMENTS

| | | | | |
|---|---|---|---|---|
| 6,168,153 | B1 * | 1/2001 | Richards et al. | 271/227 |
| 6,199,853 | B1 | 3/2001 | Andoh | |
| 6,494,453 | B1 | 12/2002 | Yamada | |
| 6,527,269 | B2 | 3/2003 | Yamada | |
| 6,549,734 | B2 | 4/2003 | Yamada | |
| 6,783,124 | B2 | 8/2004 | Tamura | |
| 6,871,851 | B2 | 3/2005 | Tamura | |
| 6,905,118 | B2 | 6/2005 | Yamada | |
| 6,921,069 | B2 | 7/2005 | Suzuki | |
| 6,955,109 | B1 * | 10/2005 | Huang | 83/549 |
| 6,957,810 | B2 | 10/2005 | Yamada | |
| 7,014,183 | B2 | 3/2006 | Tamura | |
| 7,182,010 | B2 * | 2/2007 | Blank et al. | 83/338 |
| 2002/0051651 | A1 | 5/2002 | Yamada et al. | |
| 2003/0035143 | A1 | 2/2003 | Glemser et al. | |
| 2003/0160376 | A1 | 8/2003 | Yamada | |
| 2003/0215275 | A1 | 11/2003 | Tamura | |
| 2003/0219295 | A1 | 11/2003 | Saitoh | |
| 2004/0104525 | A1 | 6/2004 | Suzuki | |
| 2004/0126163 | A1 | 7/2004 | Asami | |
| 2004/0254054 | A1 | 12/2004 | Suzuki | |
| 2004/0256783 | A1 | 12/2004 | Iida | |
| 2005/0000336 | A1 | 1/2005 | Hattori | |
| 2005/0061131 | A1 | 3/2005 | Tamura | |
| 2005/0067777 | A1 | 3/2005 | Iida | |
| 2005/0189706 | A1 | 9/2005 | Tamura | |
| 2005/0206071 | A1 | 9/2005 | Suzuki | |
| 2005/0218579 | A1 | 10/2005 | Yamada | |
| 2005/0225021 | A1 | 10/2005 | Yamada | |
| 2006/0022394 | A1 | 2/2006 | Tamura | |
| 2006/0055100 | A1 | 3/2006 | Suzuki | |

FOREIGN PATENT DOCUMENTS

| | | | |
|---|---|---|---|
| JP | 2004-270320 | | 9/2004 |
| JP | 2006-082936 | | 3/2006 |
| WO | WO 98/33661 | * | 8/1998 |

OTHER PUBLICATIONS

European Office Action dated Aug. 17, 2007 for counterpart European Application No. 06254409.3-2302.

Office Action for Japanese patent application No. 2005-248093 dated Jan. 19, 2010.

* cited by examiner

PERFORATING APPARATUS, SHEET PROCESSING APPARATUS, AND IMAGE FORMING APPARATUS

BACKGROUND OF THE INVENTION

1. Field of the Invention

The present invention relates to a perforating apparatus, sheet processing apparatus, and image forming apparatus for perforating sheet material when conducting finishing such as binding of sheet material such as paper that has undergone image formation processing.

2. Description of the Background Art

Image forming apparatuses such as copiers, printers or fax machines, as well as printing presses can output images by transferring to a recording sheet such as paper visible images such toner images that have been carried on a latent image carrier. Other than when discharging in order from the image forming apparatus onto the discharge tray, the recording sheets may be transported to a finisher that perforates for filing, or conducts finishing such as printing, adding information, or subdividing into sheet groups.

Many finishers are used by connecting to the recording sheet discharge position of the image forming apparatus, and, for example, in addition to perforating for filing, the recording sheets are transported to inside the finisher, undergo finishing such as binding, and are discharged. One of the reasons that perforating is conducted first is that when conducting post-processing such as binding, the staples used in binding interfere and make perforation difficult.

When perforating, punch holes are formed on the predetermined edge of the transported recording sheets, but there are many types of perforation, and, for example, 2-hole, 3-hole and 4-hole perforation are representative types often seen in Japan and Europe. Moreover, in contrast to the punch hole diameters of $\phi$6.5 for 2-hole perforation in Japan, $\phi$8 may be selected for 2-hole and 3-hole perforation in the North America. $\phi$6.5 may be selected for 4-hole perforation in Europe, and there are 4-hole perforations in Northern Europe that do not have equivalent spacing. Further, in addition to these formats, there are also multiple hole perforations for binders and the like.

Meanwhile, A4 and A3 size recording sheets are used as the recording sheet format for perforation in Japan and Europe, but in contrast, legal size recording sheets are often used in North America, and even with the same 2-hole and 3-hole perforation, the positions may differ between Japan, Europe and North America.

In the past, for example, Japan Patent Application Laid-open No. 2002-128385 (paragraph [0017] disclosed a configuration that addresses differing punch hole perforation positions and achieves various perforation formats by providing in a single perforation unit multi-stage punches that correspond to 2-hole and 3-hole uses and the like, and combines a main drive side and supplementary drive side used as the drive system of these punches.

If the number of punch holes and perforation position have been determined, perforation can be handled using a configuration like that disclosed in the above mentioned Japan Patent Application Laid-open No. 2002-128385, but, for example, if rather than a general user, the user is a book binder who receives many requests from clients desiring punch hole and perforation positions that differ from the predetermined format, when the perforating apparatus with a preset structure does not correspond to the desired format, it is necessary to replace that apparatus with a special order perforating apparatus that corresponds to the desired format. However, a worker may not be trained in the configuration, and may have difficulty on his own in the assembly operation for removing the perforating apparatus from the image forming apparatus and replacing with a new perforating apparatus, and a service technician may need to conduct the replacement operation. Therefore, operations in the book binding process may have to be temporarily suspended.

Moreover, when perforating with a punch hole, after the lateral registration has been adjusted to correct for discrepancies in the width direction, which is equivalent to the direction perpendicular to the direction of transport of the recording sheet, to execute the perforation operation, highly precise determination of the perforation position of the recording sheet in the width direction is to be conducted. Therefore, when incorporating the replacement perforating apparatus into the post-processing apparatus main unit, the replacement operation is not simple even for a service technician because incorporation into the drive unit requires precision.

Meanwhile, the punch drive and the drive mechanism for the aforementioned lateral registration adjustment are respectively mounted in the perforating apparatus, but the fact that drive mechanisms are provided in every perforating apparatus makes the high cost of the perforating apparatus, especially the cost of parts, a concern.

When replacing the existing perforating apparatus with a perforating apparatus for special order parts, the type of perforating apparatus replaced is confirmed and the conditions must be set corresponding to this type, but if the user sets the conditions, improper operation or tedious operation become problems. There is also the problem that the perforation operation cannot be conducted unless it is verified whether the perforating apparatus targeted for replacement has undergone position determination to the specified position. Therefore, these types of operations constrain the user, and there is the concern of placing a large burden on the user.

SUMMARY OF THE INVENTION

With the foregoing problems in view regarding post-processing apparatuses in which conventional perforating apparatuses are provided, it is an object of the present invention to provide a perforating apparatus, sheet processing apparatus and image forming apparatus that comprise a configuration wherein replacement can be easily conducted corresponding to the punch holes and the perforation conditions such as number of holes, and when replaced, condition settings and position determination can be automatically recognized.

In accordance with the present invention, a perforating apparatus for conducting perforation processing on sheet material can be provided, comprising: a perforation device comprising a punch for conducting the aforementioned perforation processing on aforementioned sheet material, and a drive device for driving the aforementioned perforation device; and the aforementioned perforation device can be inserted into and detached from the aforementioned drive device.

Moreover, in accordance with the present invention, a sheet processing apparatus can be provided comprising a perforating apparatus that conducts perforation processing on sheet material, the perforating apparatus comprising: a perforation device comprising a punch that conducts the aforementioned perforation processing on sheet material, and a drive device to drive the aforementioned perforation device; and the aforementioned perforation device can be inserted into and detached from the aforementioned drive device.

Further, in accordance with the present invention, an image forming apparatus can be provided comprising a perforating apparatus that conducts perforation processing on sheet material, the perforating apparatus comprising: a perforation device comprising a punch that conducts the aforementioned perforation processing on sheet material, and a drive device for driving the aforementioned perforation device; and the aforementioned perforation device can be inserted and detached in relation to the aforementioned drive device.

BRIEF DESRIPTION OF THE DRAWINGS

The above and other objects, features and advantages of the present invention will become more apparent from the following detailed description taken with the accompanying drawings in which.

Figure 19:
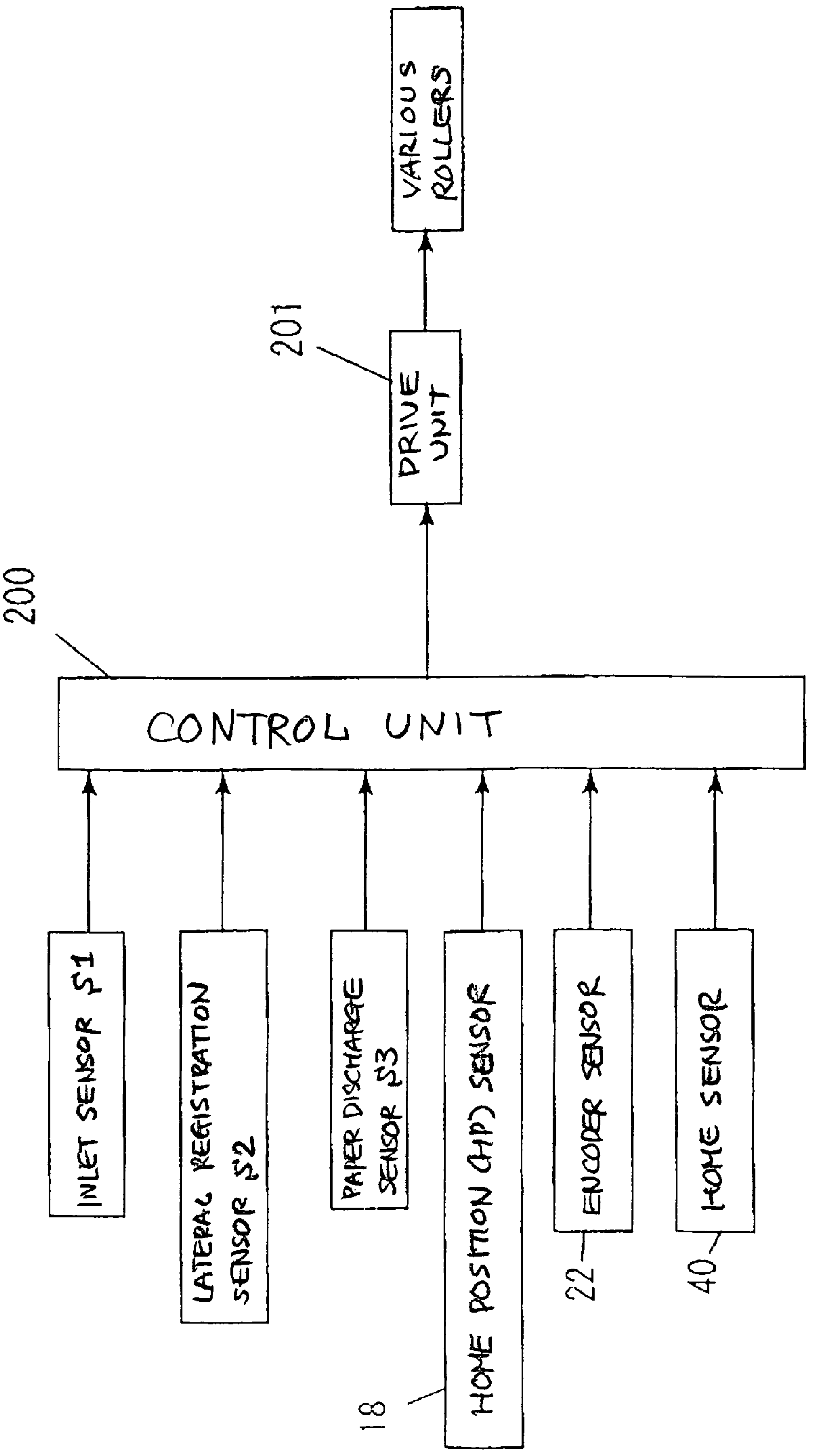
FIG. 19 is a flowchart to explain the configuration of the control unit used in the same perforating apparatus.
Figure 27A:
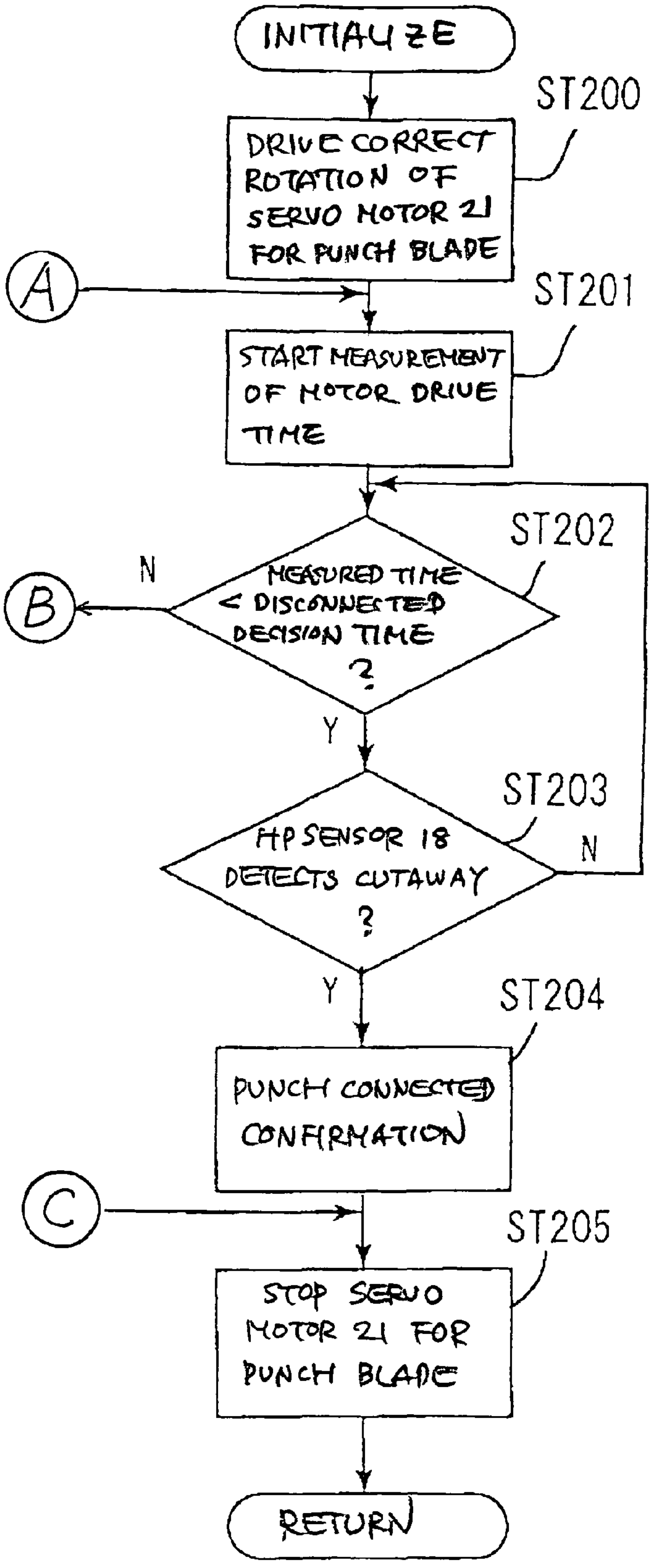
Figure 27B:
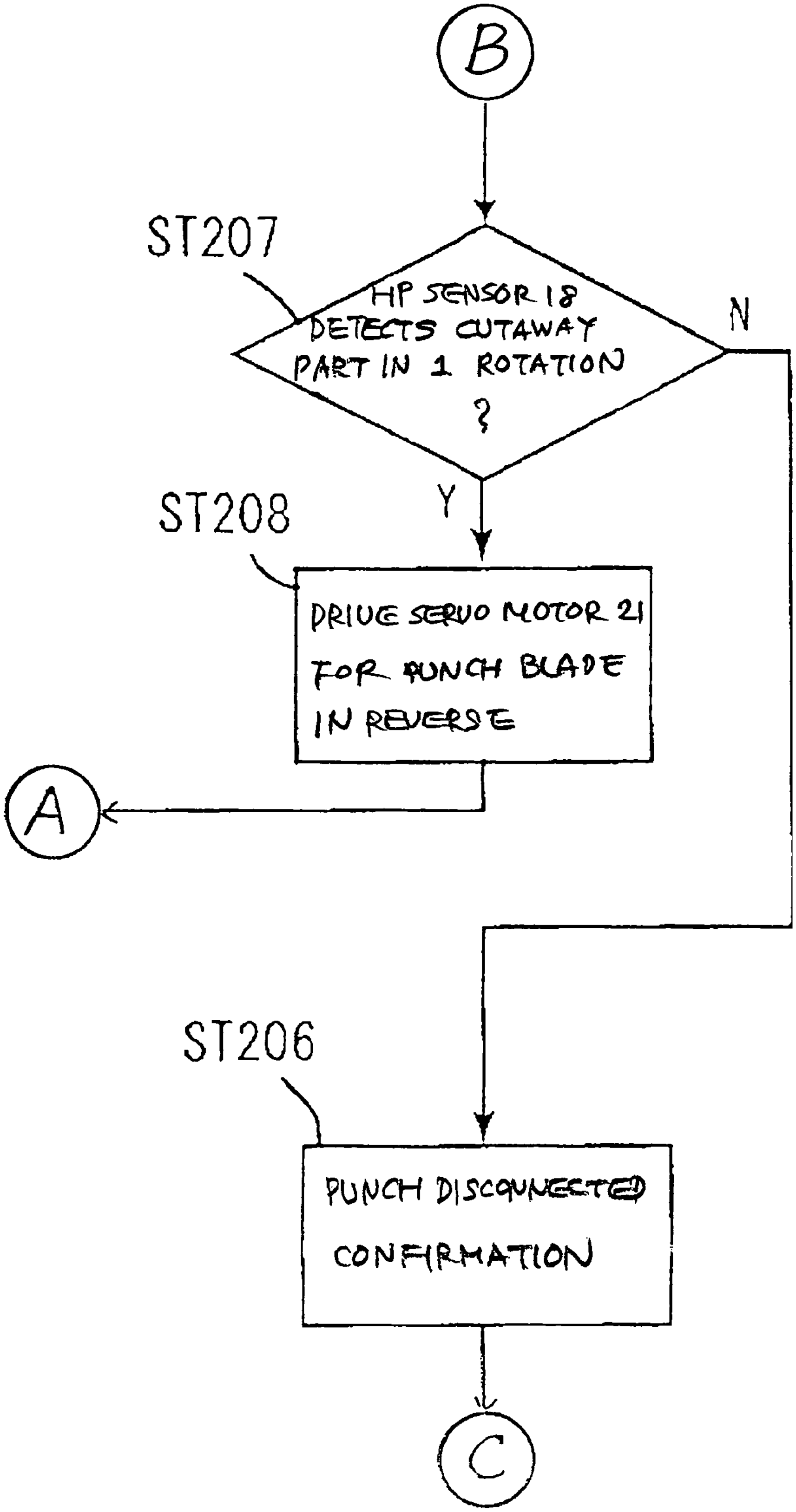
Figure 28A:
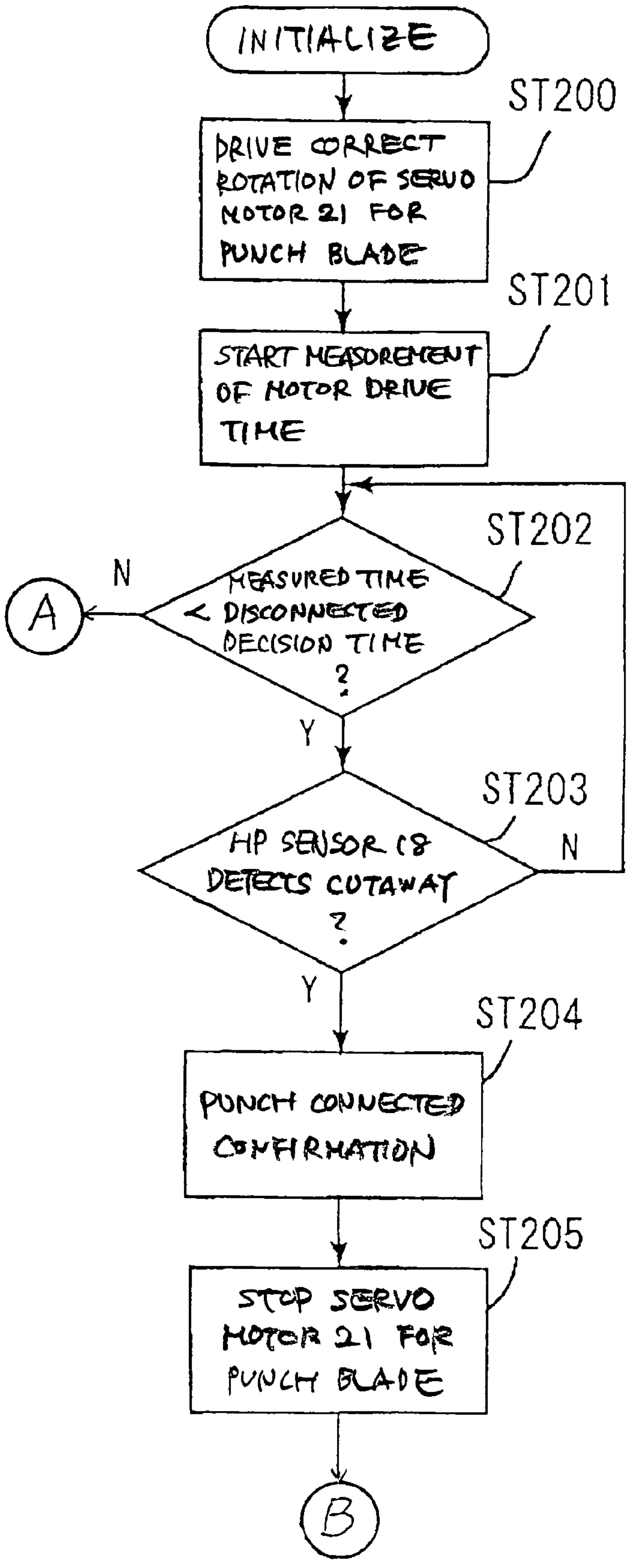
Figure 28B:
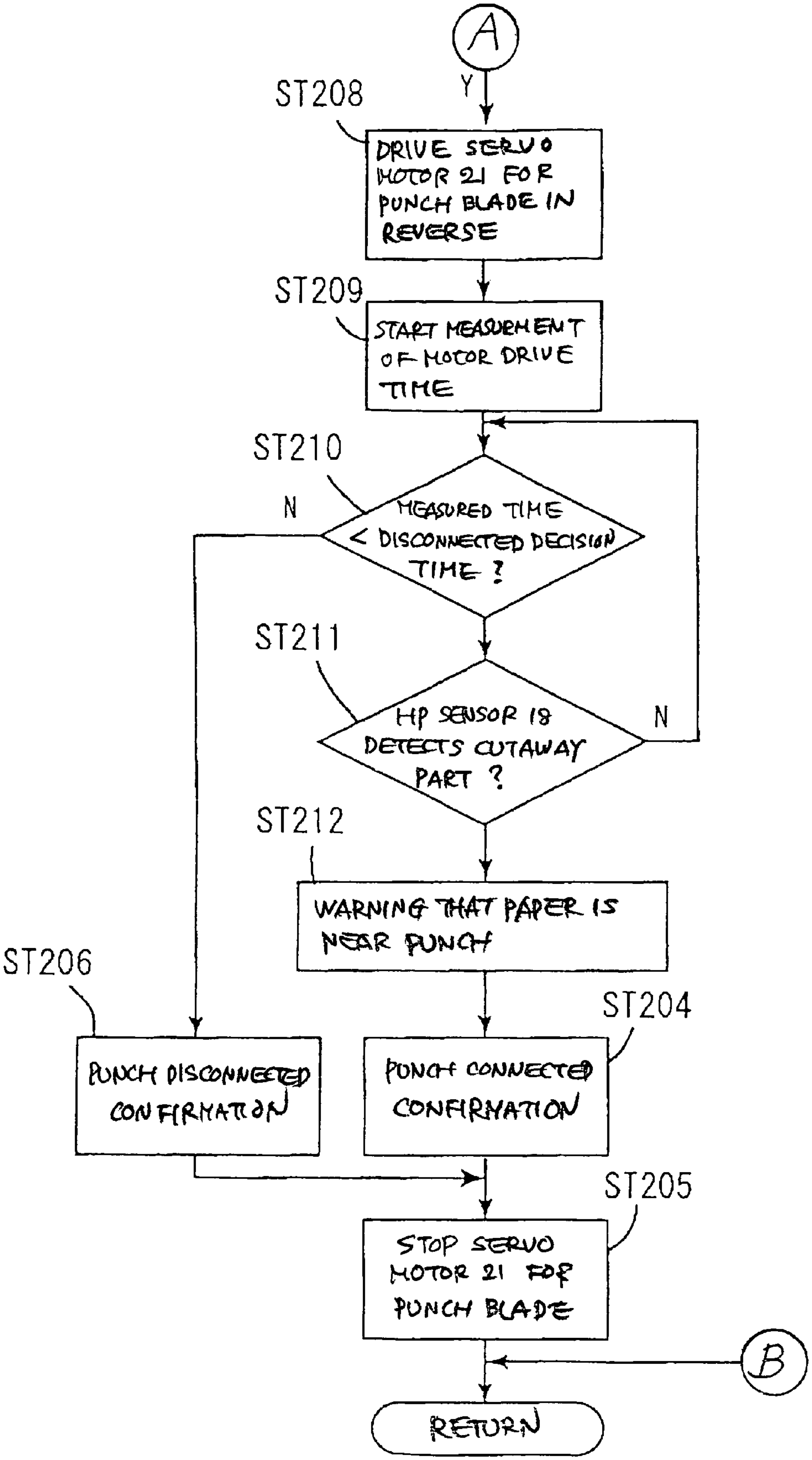

FIGS. 27A and 27B are flowcharts indicating another example relating to processing to determine the drive transmission continuation state of the perforation device that is executed by the control part indicated in FIG. 19; and FIGS. 28A and 28B are flowcharts indicating yet another example relating to processing to determine the drive transmission continuation state of the perforation device that is executed by the control part indicated in FIG. 19.

DESCRIPTION OF THE PREFERRED EMBODIMENT(s)

Embodiments of the present invention will be explained in detail below while referring to the diagrams.

Figure 1:
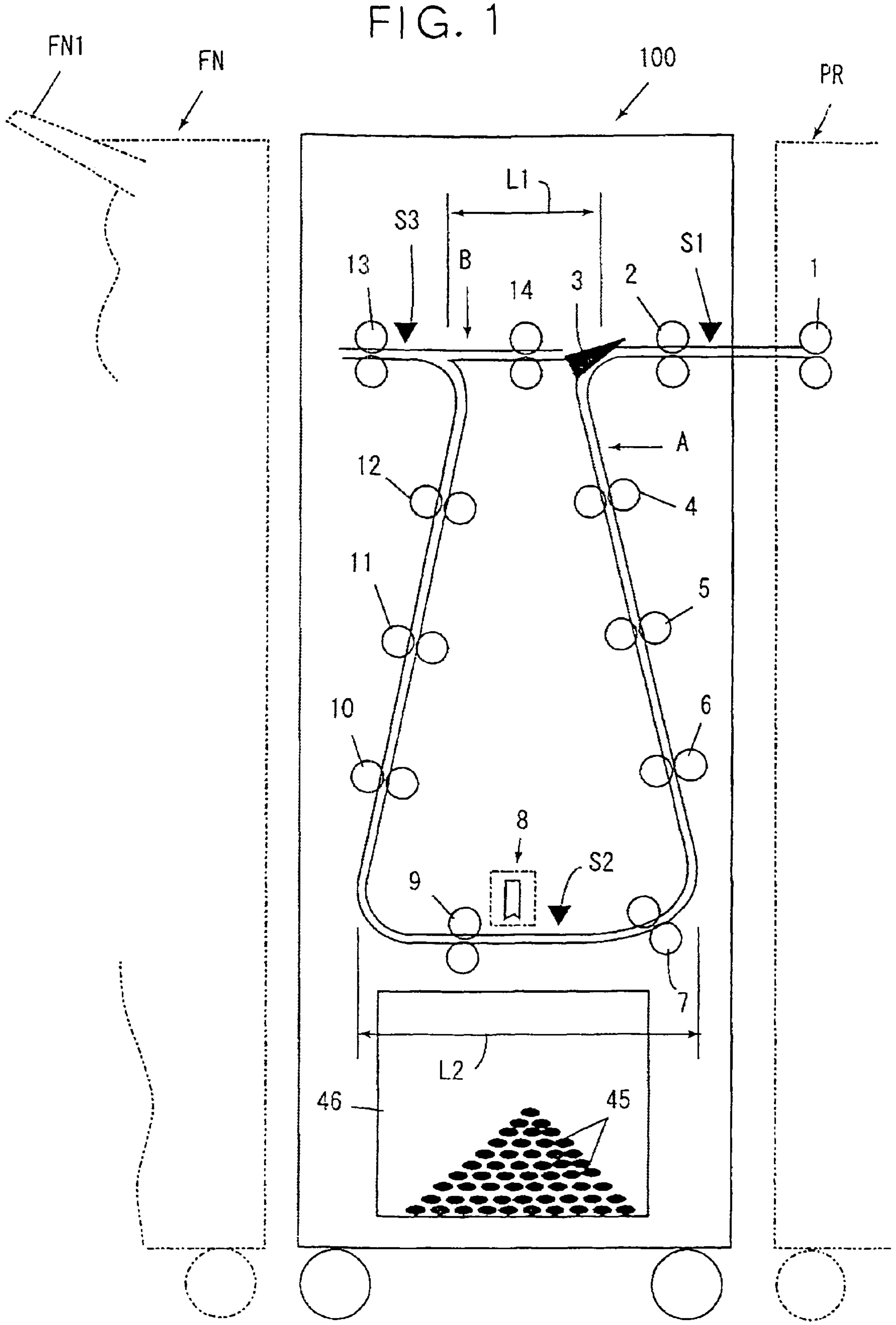
FIG. 1 is a schematic diagram to explain the configuration of the transport route in a perforating apparatus according to an embodiment of the present invention.

Indicated in FIG. 1 is the configuration of a perforating apparatus according to one embodiment of the present invention. In the following explanation it is assumed that the sheet material will be called paper.

In the same diagram, perforating apparatus 100 is arranged adjacent to the vicinity of a discharge paper outlet equipped with a main unit discharge paper roller 1, which is a discharge device of an image forming apparatus PR that positions the paper to the discharge side. A transport route A (called "perforation transport route" hereinafter) in a roughly U-shaped form is provided inside the apparatus main unit. The perforation transport route A is extended in the vertical direction on the side of transportation that is branched from a discharge transport route B that is used when discharging paper, for which perforation has not been provided, from the main unit discharge paper roller 1, as well as on the discharge side where the routes join, and the lowest part of the route A extends substantially in the horizontal direction.

A discharge transport route B, which is on the transport out side of the perforation transport route A and which merges with the same, connects through to the paper receiving inlet (not indicated in the diagram) of the finisher FN connected to a position equivalent to the paper movement direction downstream side. The finisher FN is an apparatus to conduct finishing such as binding and sorting, and is provided with discharge tray FN1 for paper that is discharged after finishing or as is without finishing.

Inlet rollers 2 are arranged on the transport in side of the perforation transport route A; a switch claw 3 is arranged at the position of branching with the discharge transport route B;

and vertical transport rollers 4, 5 and 6 are arranged following along the transport in side. Further, registration rollers 7 are arranged at the lowest part on the inlet side as a position correction device that conducts skewing correction and leading edge alignment by striking the leading edge of the paper; and a punch unit 8 is arranged in roughly the center of the lowest part as a perforating device.

Meanwhile, post-punch transport rollers 9 are arranged near the punch unit 8 at the lowest part of the perforation transport route A; vertical transport rollers 10, 11, and 12 are arranged on the transport out side connected to the lowest part; and discharge rollers 13 are arranged at the outlet on the transport out side.

Figure 7:
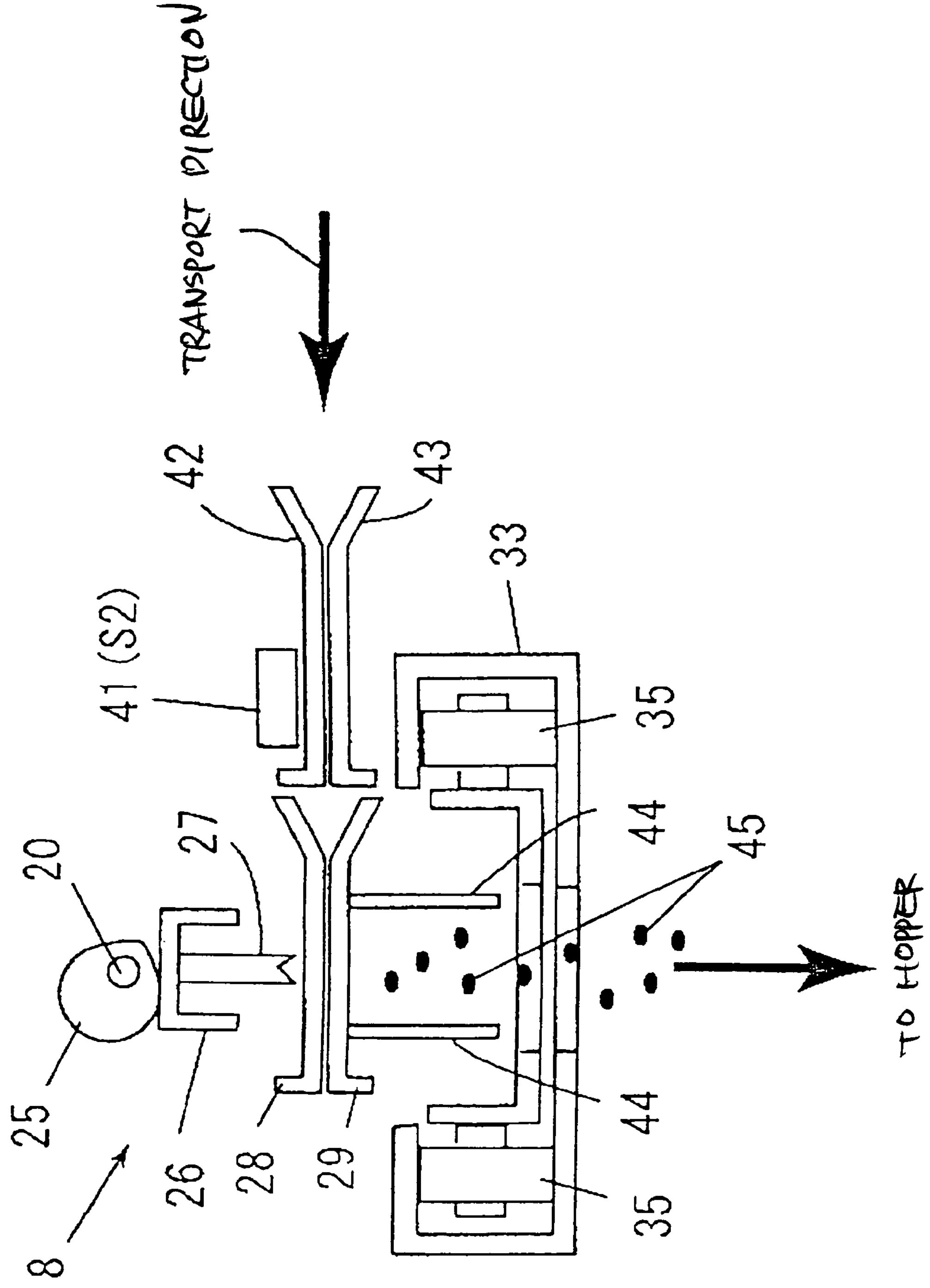
FIG. 7 is a schematic diagram to explain the perforation debris discharge structure of the same punch unit.

The perforation transport route A is formed into a rough U-shape to make the transport route of the transport in and out sides into a vertical format, and as indicated in FIG. 7, the transport direction switching position of the lowest part connecting these transport in and out sides is configured to set a curvature radius that can use the shape restoration force of the paper to predispose the paper to tightly adhere by warpage return to a punch lower guide plate 29 and a punch front lower guide plate 43 that are provided in the punch unit 8.

By using this kind of curvature radius, the paper reaching the punch unit 8 can not float up by pressing on the punch lower guide plate 29; unstable behavior such as the paper being displaced when passing through the punch can thereby be prevented; and satisfactory perforating operations can be conducted by efficiently utilizing the shear force of the punch unit 8.

Moreover, the transport distance of the transport in side of the perforation transport route A reaches from the main unit paper discharge roller 1 to the registration rollers 7 is set to be longer than the maximum size of the paper to be perforated. Therefore, the paper that has advanced to the transport in side moves through the transport in side such that the leading edge of the paper is extracted from the main unit paper discharge rollers 1. Thereby, when the leading edge has reached the registration roller 7, the paper is not affected by the speed of the main unit paper discharge rollers 1, and therefore, the amount of bending is not increased when the leading edge strikes the registration rollers 7 and is stopped, and the production of paper kinks and wrinkles by increased bending can be prevented.

Further, as indicated by the codes L1 and L2 in FIG. 1, the perforation transport route A has a triangular flask shape in which the transport distance of the lowest part is longer than the transport route of the paper that is discharged as is without the perforation operation, specifically, longer than the distance between the positions branching from the discharge transport route B on the paper transport in and transport out sides. The curvature radius of the switching position between the transport in side and the lowest part can thereby be made larger, and the distance reaching from the main unit paper discharge rollers 1 to the registration rollers 7 can also be made longer. Therefore, the behavior of the paper opposite the punch unit 8 can be stabilized.

Specifically, by making the paper taken out from the main unit paper discharge rollers 1 move a long distance, the amount of bending can be set without being affected by the speed from the main unit paper discharge rollers 1, and skewing to be corrected and leading edge alignment can be stabilized by this amount of bending. Moreover, the horizontal space is not as big as the length of the transport route on the transport in side, and therefore, stabilized skewing correction and leading edge alignment is possible without enlarging the setup space of the perforating apparatus 100.

Meanwhile, a hopper 46 that can receive the perforation debris produced when perforating with the punch unit 8, that is, punch debris 45, is arranged at a position opposing the punch unit 8 between the transport routes on the lowest part of the perforation transport route A.

The hopper 46 is set up in a location where the punch debris 45 will naturally fall when perforated by the punch unit 8. For example, differing from when the punch unit is provided on a vertical transport route, the position when scattering by perforation is clearly below the punch, and therefore it is not necessary to set up a large range to receive the debris, and a debris capture region utilizing the horizontal setup space of the perforating apparatus can be provided without any structure on the side of the punch unit 8 to lead the debris.

In the present embodiment, the paper transport speed in the perforation transport route A is controlled.

Specifically, after the paper targeted for perforation has reached the registration rollers 7, when beginning to reel out, the speed is increased to greater than the linear speed of the main unit paper discharge rollers 1, and when the paper reaches the discharge transport route B, transport is conducted at a a speed equivalent to the transport speed of the main unit paper discharge rollers 1. Thereby, while the transport gap for avoiding collision with the subsequent paper works by increasing the speed, the speed is made equivalent to the transport speed when transporting as is without the perforating operation upon reaching the discharge transport route B, and the receiving speed at the finisher FN, which is positioned downstream of the perforating apparatus 100, can be made uniform using the receiving control on the finisher FN side to equalize the state of the paper that is directly discharged from the image forming apparatus PR and the state of the paper discharged through the perforation processing device 100.

A control unit 200 indicated in FIG. 19 is used in the present embodiment for this kind of transport control.

In FIG. 19, the control unit 200 is a part that executes sequencing to control image formation and book binding operations in batches, and as a configuration related to the present embodiment, an input sensor S1, lateral registration sensor S2, and a paper discharge sensor S3 are connected to the input side, and a drive unit 201 of the vertical transport rollers 4 to 6 and 10 to 12, registration roller 7 and the punch unit 8 is connected to the output side (in FIG. 19, these are displayed together as the drive unit).

While the perforating apparatus 100 controls the transport, the control unit 200 executes the content in FIGS. 17A to 17E.

FIGS. 17A to 17E are flowcharts to explain the action of the control unit 200, and when the apparatuses related to bookbinding are started up, beginning with the image forming apparatus PR, data is reset and the various apparatuses are initialized, and the job commands from the operating panel not indicated in the diagram are determined (ST1 to ST3).

When entering the job commands, input rollers 2 are driven (ST4), and vertical transport rollers 4, 5 and 6 are driven at the linear speed of the main unit paper discharge rollers 1 of the image forming apparatus PR side (ST5).

The input sensor S1 determines the paper transport status (ST6), and when transporting in, determines whether or not the leading edge of the sheet has reached the registration rollers 7 (ST7). If the leading edge has reached the registration rollers 7, rotation drive of a specified amount to standardize the time is conducted in relation to the input rollers 2 and the vertical transport rollers 4, 5 and 6, and a specified amount of bending is set (ST8). Determination the amount of bending in this case is conducted by the amount of advance if a stepping motor is used as the roller drive source, and by an encoder if any other motor is used.

When the amount of bending is set at the specified amount, the vertical transport rollers 4, 5 and 6 are stopped (ST9), and these vertical transport rollers 4, 5 and 6 as well as the registration rollers 7 are next driven at high linear speed (ST10, 11). The paper that has completed skewing correction and leading edge alignment by the registration roller 7 is thereby moved to the transport in side at a speed higher than the receiving speed so that the transport gap between the subsequent paper is not shortened.

Meanwhile, the lateral registration sensor S2 positioned in front of the punch unit 8 determines that the paper to be moved by high linear, speed has passed through (ST12), and the post-punch transport rollers 9 and the vertical transport rollers 10, 11 and 12 on the transport out side are driven at high linear speed at this time (ST13, 14).

The punch unit 8 conducts moving processing to correct the perforation position corresponding to the results of the lateral discrepancy determined by the lateral registration sensor S2 (ST15, 16); when the back edge of the paper has reached the perforation position (ST17), the post-punch transport rollers 9 and the vertical transport rollers 10, 11 and 12 on the transport out side are stopped (ST18, 19), and perforation is conducted. Here, perforating is conducted on the paper without the perforation positions between sheets of paper differing because the registration rollers 7 align the leading edge and correct skewing (ST20).

When perforating is completed, the post-punch transport rollers 9 and the vertical transport rollers 10, 11 and 12 on the transport out side are driven at high linear speed respectively (ST21, 22) and the paper discharge rollers 13 are also driven at high linear speed (ST23).

Meanwhile, the paper discharge sensor S3 determines whether the paper moved at high speed on the transport out side has been detected (ST24), and if detected, the vertical transport rollers 10, 11 and 12 on the transport out side as well as the paper discharge rollers 13 move at the linear speed of the main unit paper discharge rollers 1, in other words, are switched to the receiving speed (ST25, 26). The paper from the perforation transport route A of the perforating apparatus 100 side is thereby discharged to the finisher FN side at the same speed as the paper that is discharged as is without the perforation operation.

Subsequently, when the paper discharge sensor S3 switches to OFF, paper remaining in the machine is detected, and if no paper remains in the machine based on the results thereof, then the transport control by the perforating apparatus 100 is ended (ST27, 28).

Figure 2:
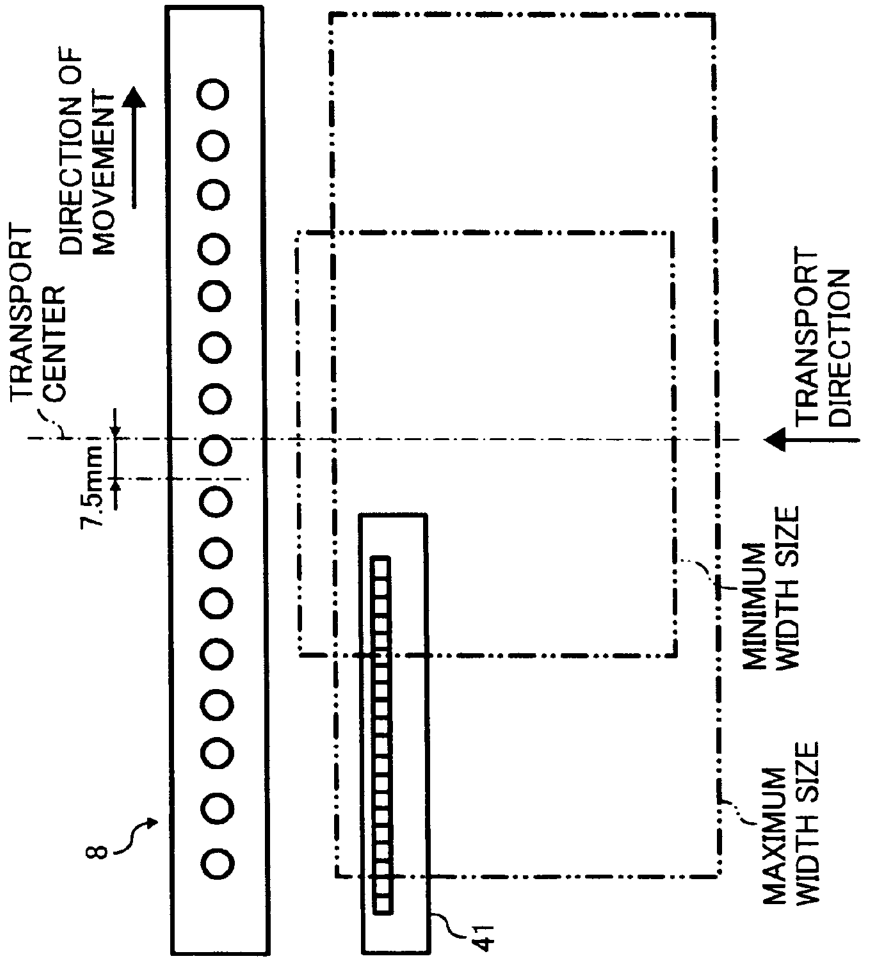
FIG. 2 is a schematic diagram to explain the configuration used for lateral registration detection executed in the same perforating apparatus.
Figure 17A:
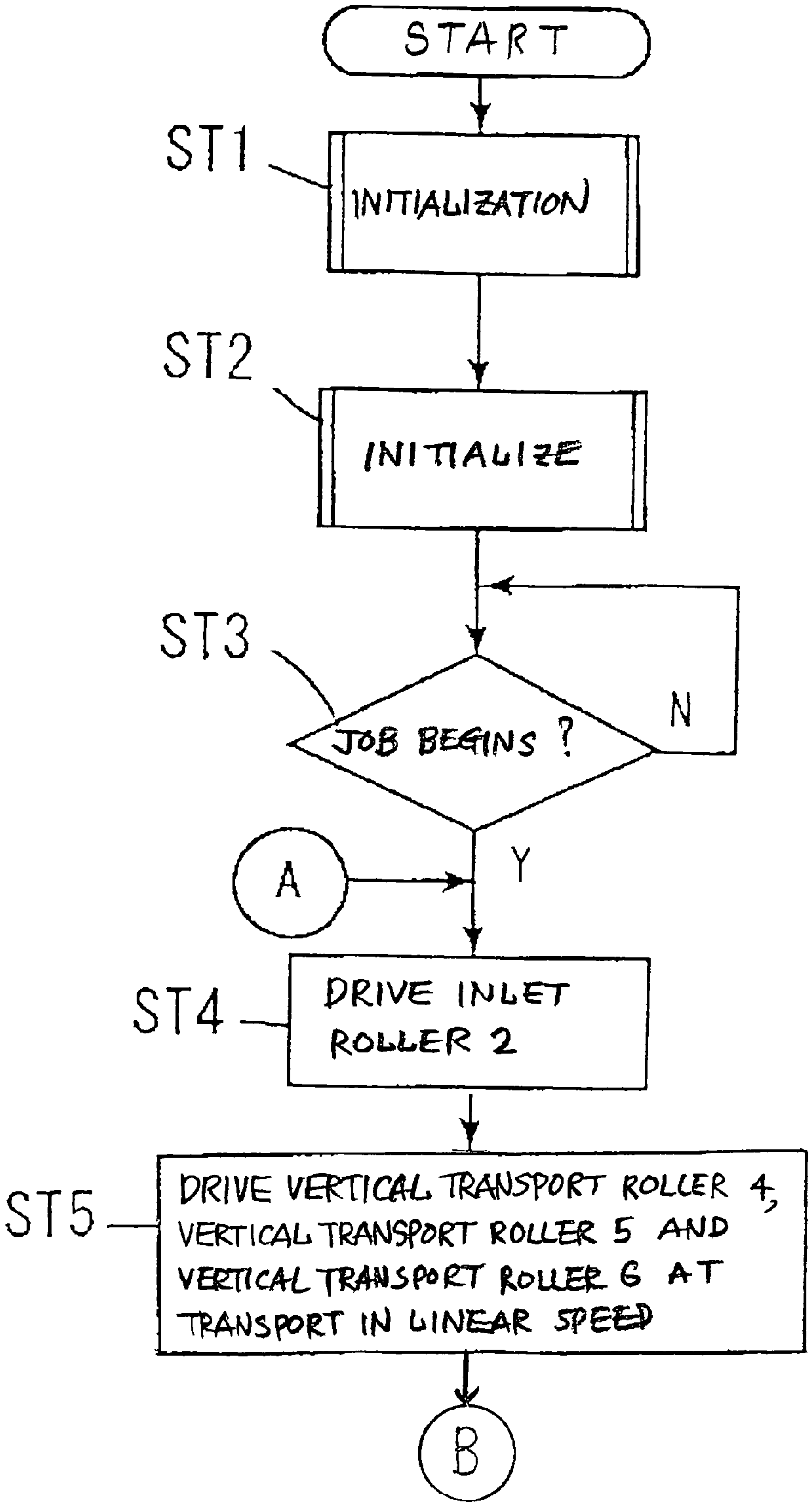
FIGS. 17A to 17E are flowcharts to explain the manipulation procedures of the same perforating apparatus.
Figure 17B:
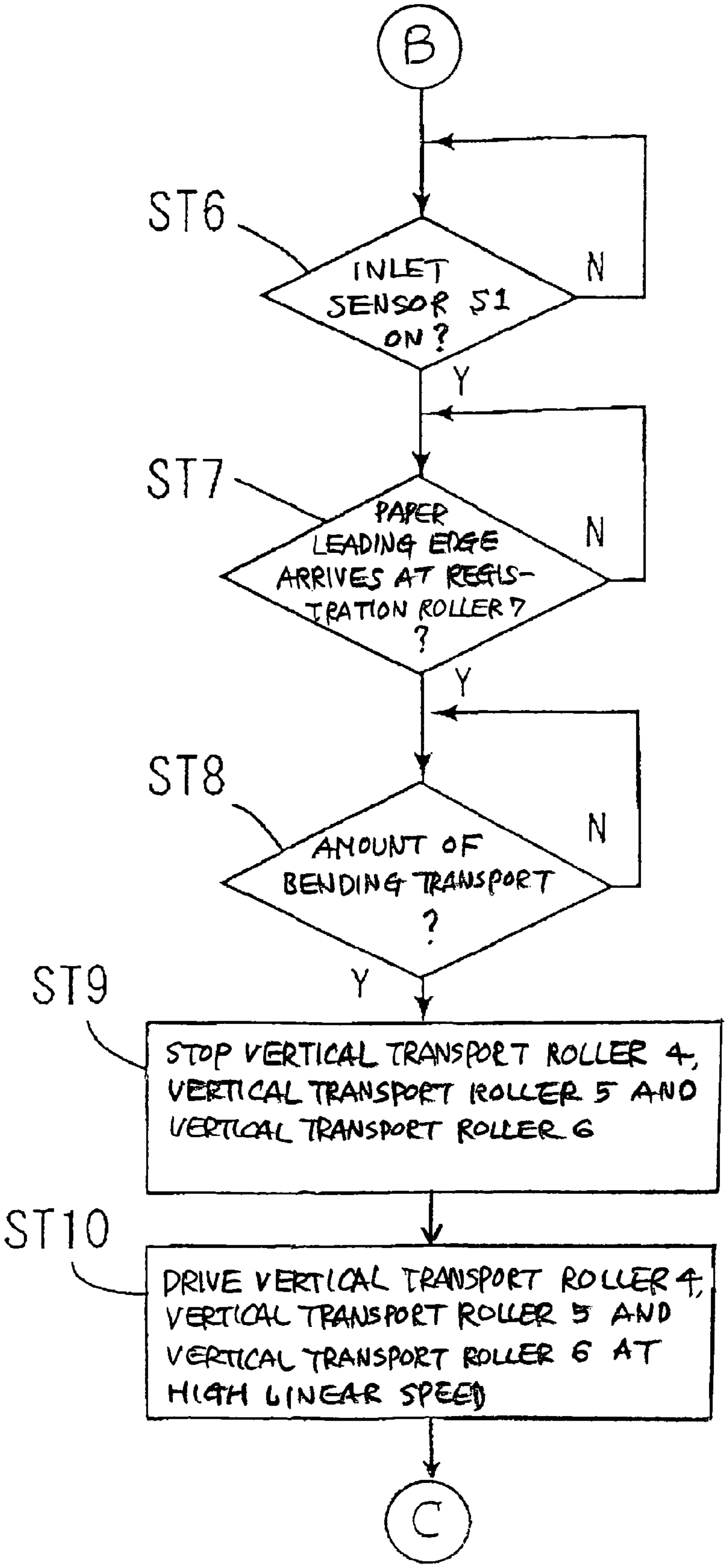
Figure 17C:
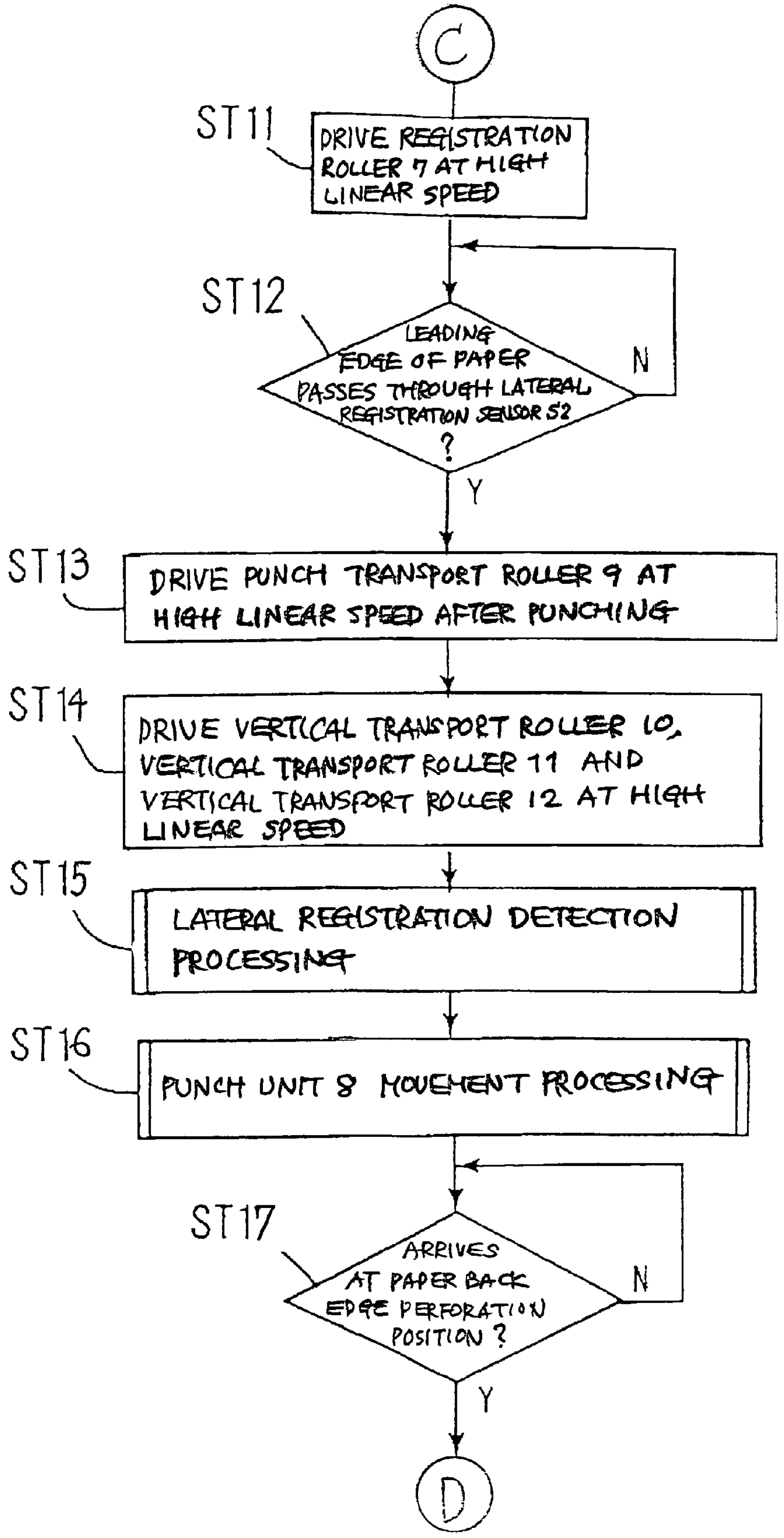
Figure 17D:
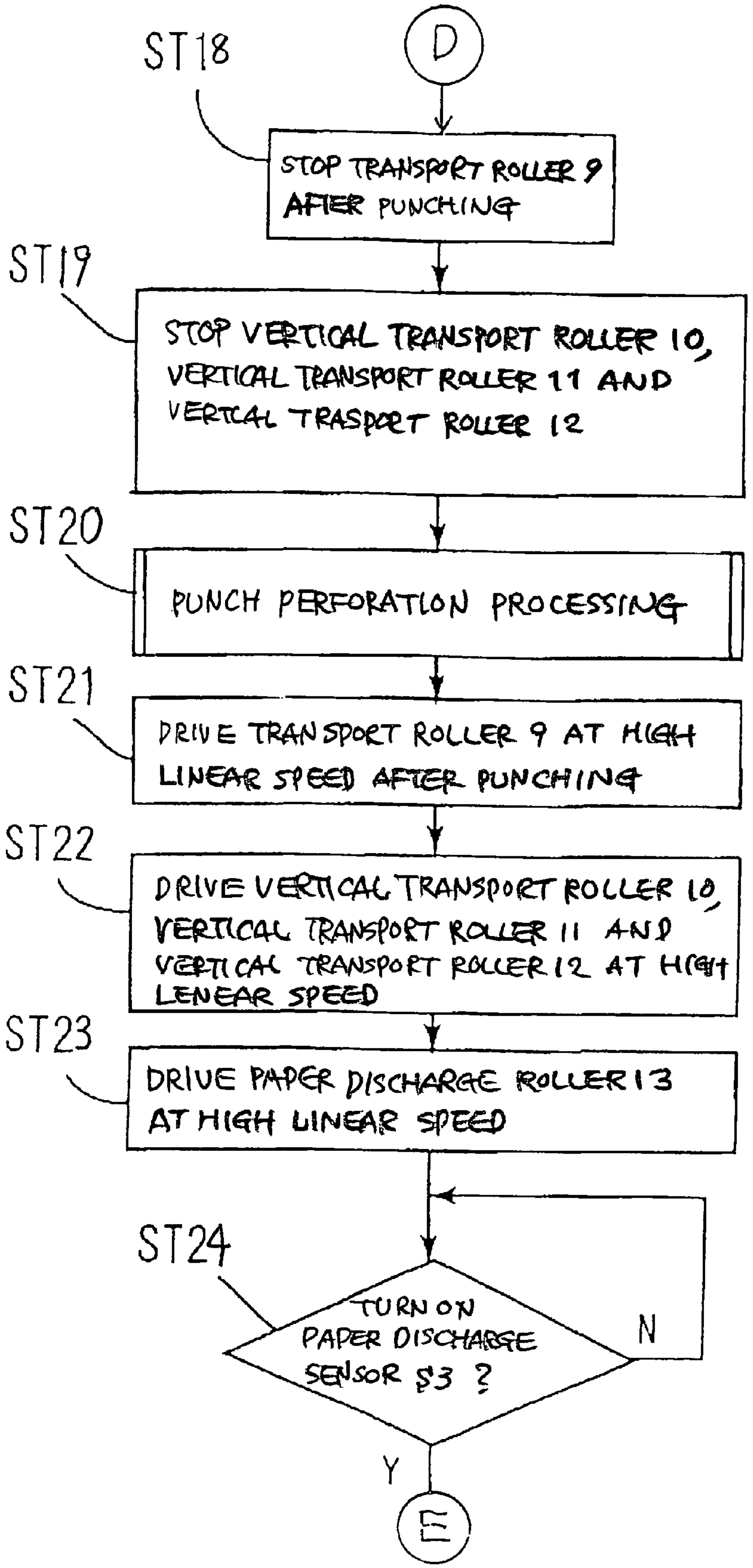
Figure 17E:
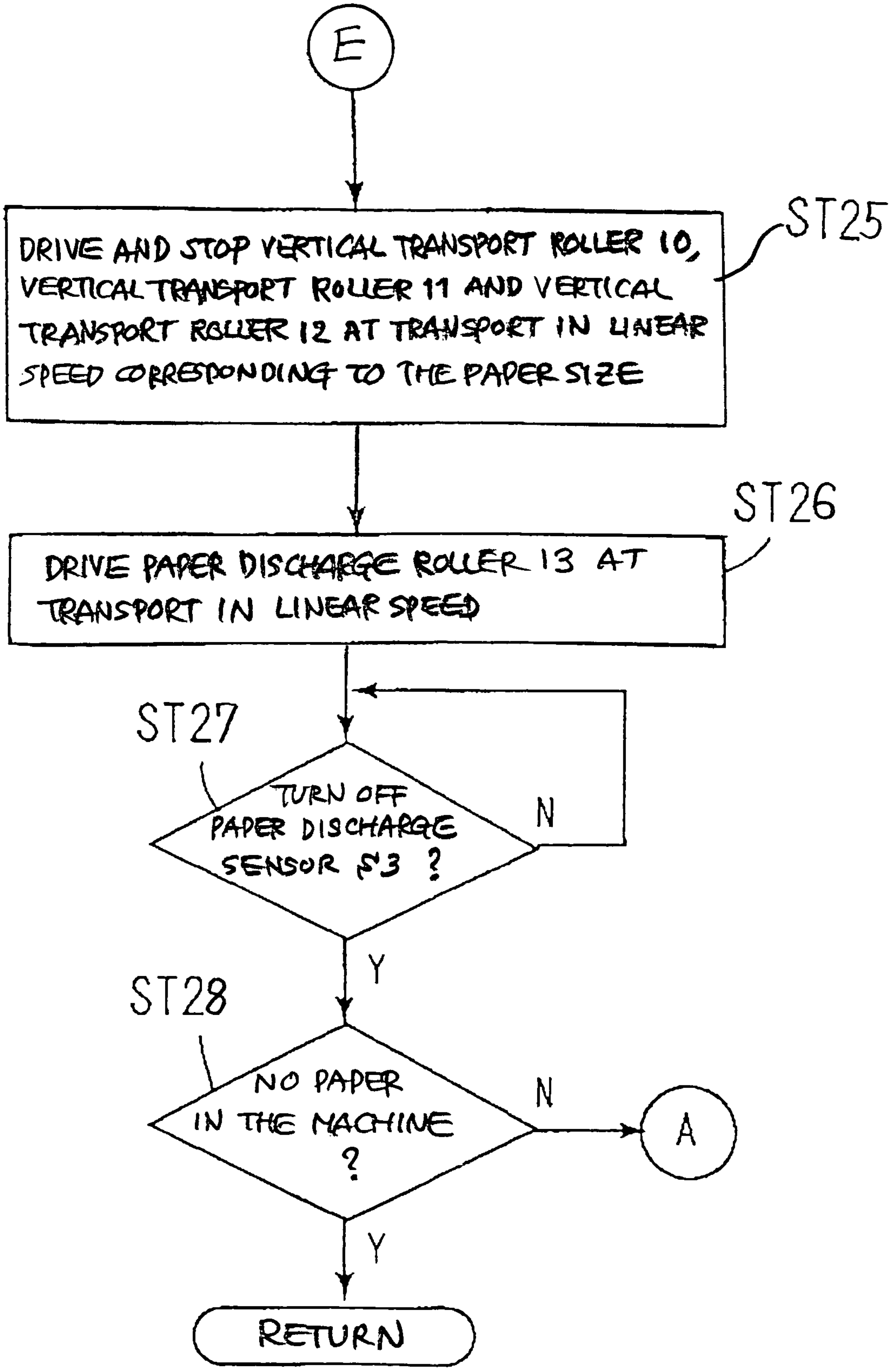
Figure 18A:
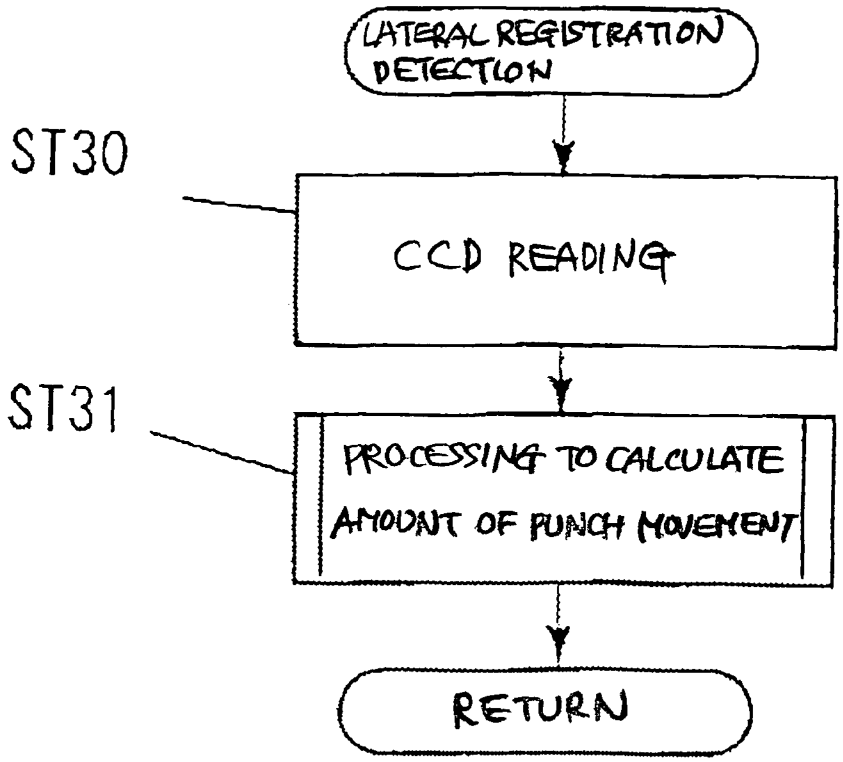
FIGS. 18A and 18B are flowcharts to explain in detail one part of the processes indicated in FIGS. 17A to 17E.
Figure 18B:
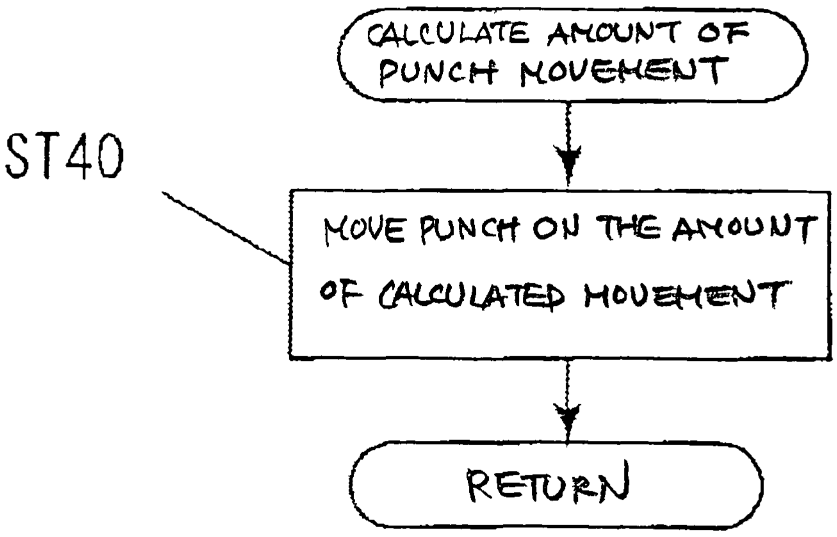

Further, FIGS. 18A and 18B are flowcharts indicating the contents of the lateral registration detection processing (ST15) and the punch movement processing (ST16) in FIG. 17C. In the same diagram, lateral registration detection processing is conducted using the lateral registration sensor S2 as indicated in FIG. 2, and in the present embodiment, a CCD line sensor is used as the lateral registration sensor S2.

The CCD line sensor can detect the side edge of the paper by arranging a CCD to encompass the range from the minimum width size to the maximum width size. Of course, detection is possible even if these papers have a lateral discrepancy, and detection up to a maximum of ±7.5 mm is possible without any problems. Next, the punch unit 8 is slid in the direction in line with the direction of transport the amount of difference between the position of the side edge detected by the lateral registration sensor S2 and the ideal transported position. The punch unit 8 waits at the front side (may also be the far side) in relation to the transport center position at a position that has been moved the assumed maximum amount of lateral registration discrepancy (set to 7.5 mm), and if transported with no lateral registration discrepancy, the punch unit 8 slides 7.5 mm and perforates. If transported with a 2 mm discrepancy to the front, the punch unit 8 is slid 5.5 mm, and perforates. Preferably, the sliding of the punch unit 8 is completed directly prior to the paper stopping at the specified perforation location. Irrespective of the paper stopping, the punch unit 8 cannot conduct perforation if in the middle of sliding, thus lowering productivity, and if sliding is completed too much in advance of the paper stopping, detection by the lateral registration sensor S2 will be premature, and the lateral registration detection precision may worsen.

In FIGS. 18A and 18B, the amount of lateral registration is determined by the output from the CCD sensor (ST30), and the amount to move the punch unit 8 is calculated correspondingly (ST31).

Meanwhile, punch movement processing is conducted by moving the punch unit 8 based on the amount of movement determined in step ST31 (ST40).

As described above, the punch unit 8 is slid in the direction in line with the direction of transport based on the amount of difference between the position of the side edge detected by the lateral registration sensor S2 and the ideal transported position, and the punch position precision is improved by position matching.

Next, the configuration and action of a punch unit 8 equivalent to the perforation means used in the present embodiment will be described in brief as follows.

The punch unit 8 of the present embodiment can move at a right angle to the direction of paper transport, that is, in the width direction of the paper, corresponding to the lateral registration determination.

Figure 15:
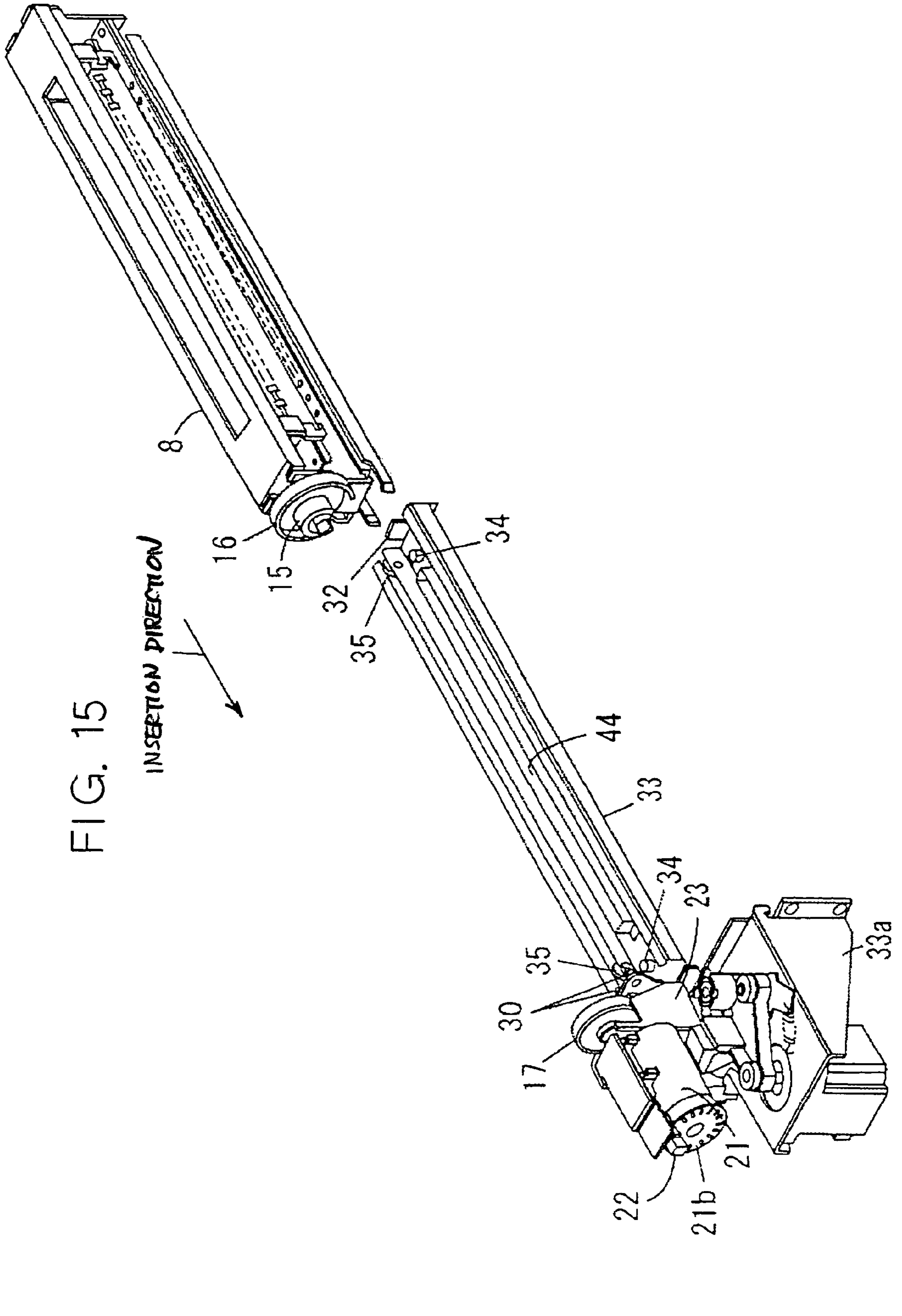
FIG. 15 is a perspective view to explain the attachment and detachment structure of the same punch unit.
Figure 16:
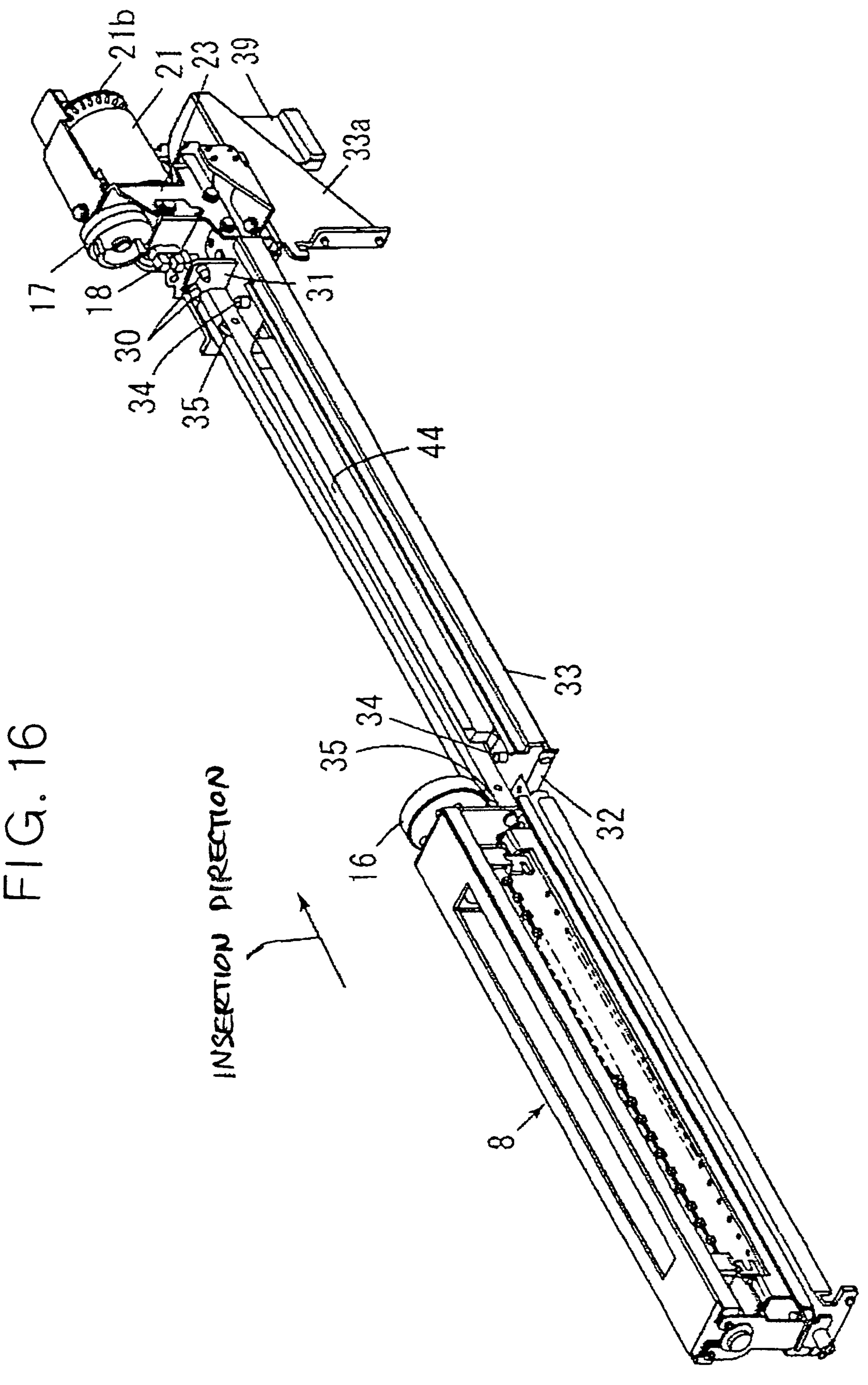
FIG. 16 is a perspective view to explain the same attachment and detachment structure as seen from the viewpoint opposite that indicated in FIG. 15.

The punch unit 8 is a member that can move lengthwise of the stay 33 used as the support unit that is secured to the non-moving part of the perforating apparatus 100, and therefore, as indicated in FIGS. 7, 15 and 16, the punch unit 8 is inserted inside the stay 33, which has a cross-sectional structure in the shape of an upward facing channel, and is mounted on a base 32, which is provided with rollers 35 lengthwise near the 4 corners. Moreover, for the stay 33 guide pins 34 are provided to extend straight up in the vicinity of the two lengthwise ends, and by mating with the mating parts formed on the base 32, the base 32 cannot move obliquely when moving inside the stay 33.

The punch unit 8 can punch punch holes in the specified positions irrespective of paper discrepancy by moving the base 32 lengthwise in the stay 33, that is, at a right angle to the paper transport direction, thereby adjusting the lateral registration, that is, the widthwise discrepancy of the paper.

Figure 3:
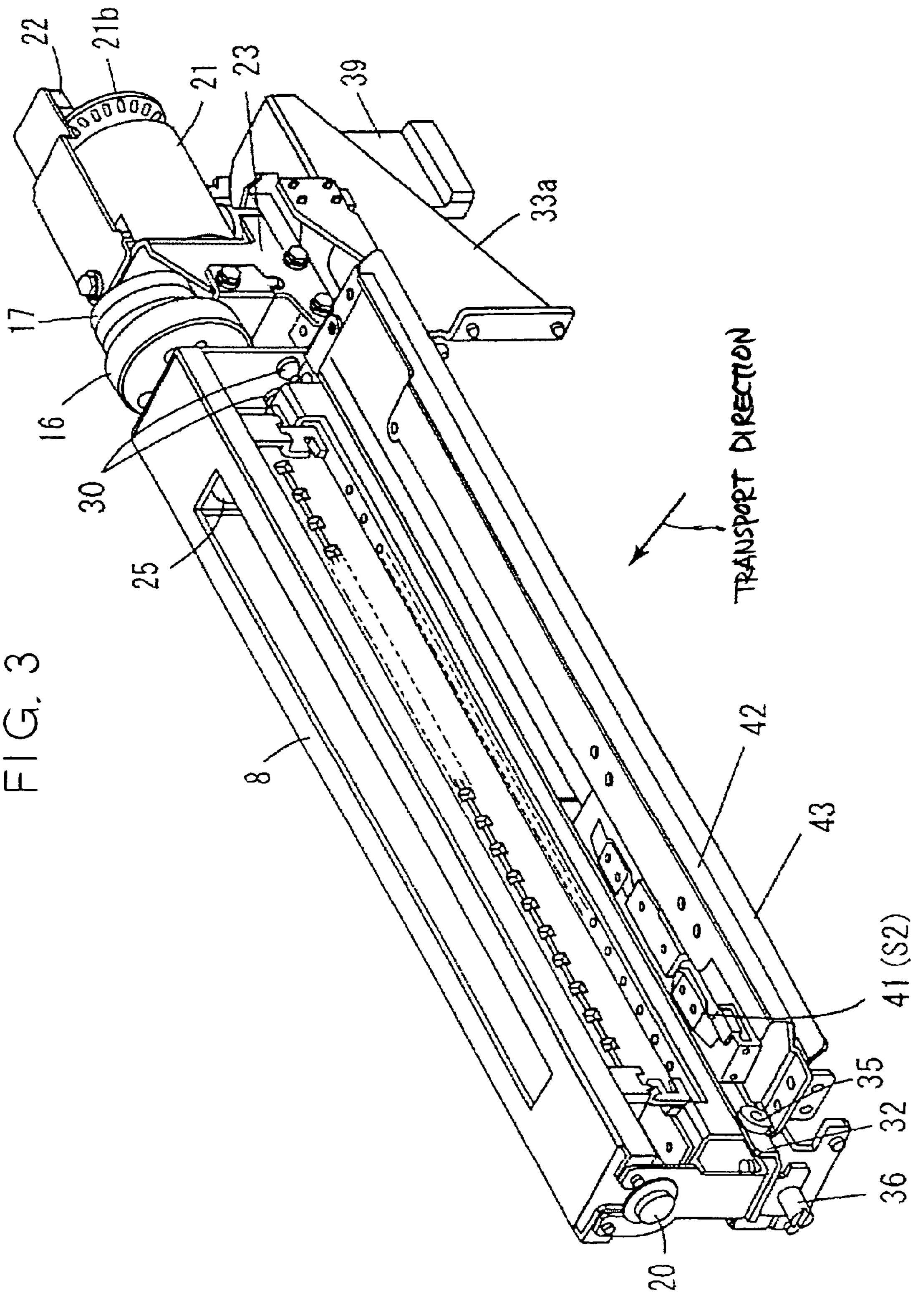
FIG. 3 is an external view of the punch unit used in the same perforating apparatus.
Figure 4:
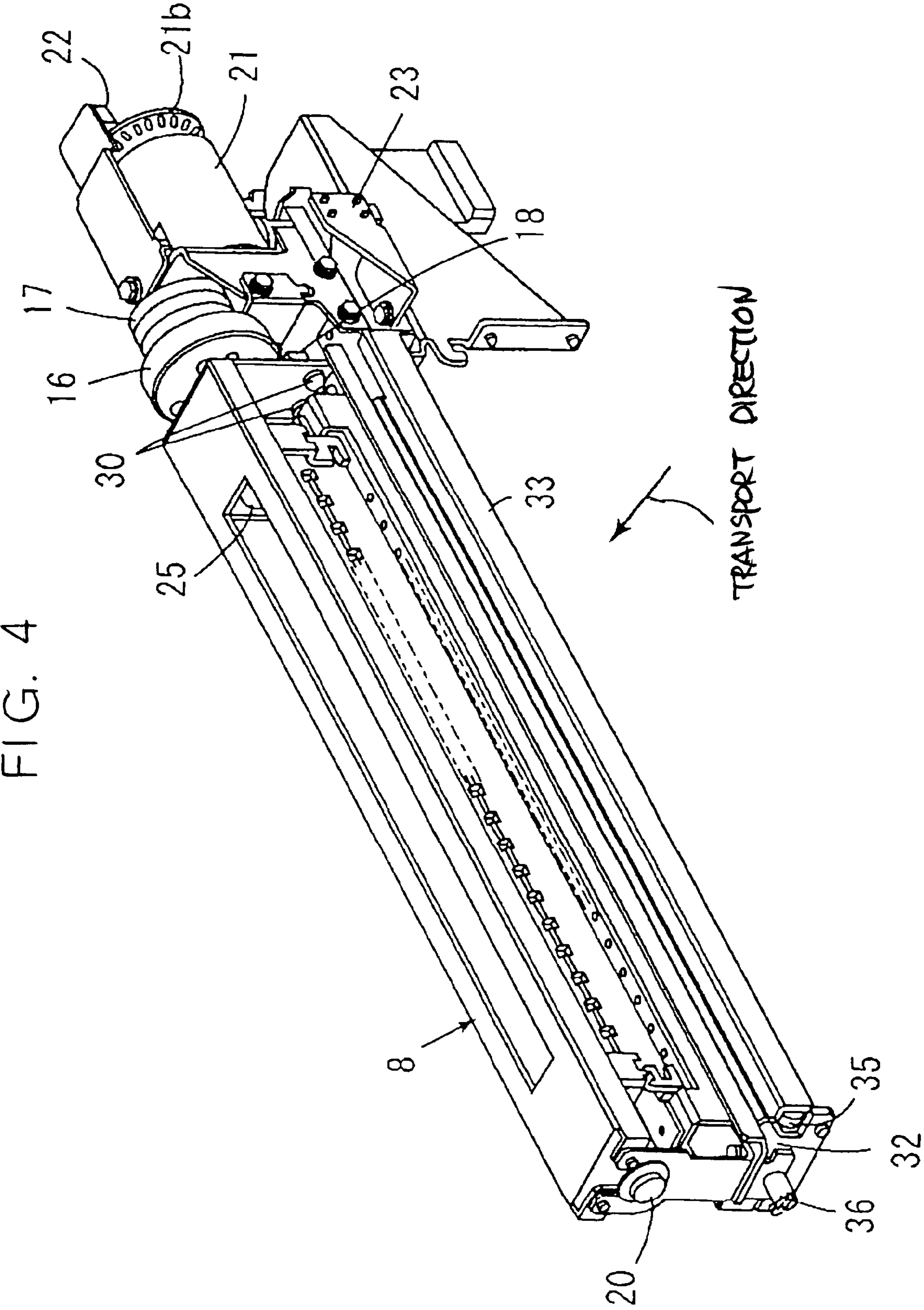
FIG. 4 is an external view indicating the same punch unit excluding the guide part.

As indicated in FIGS. 3 and 4, when mounting and securing the punch unit 8 in the base 32, a pair of docking pins 30, which are secured to a pin bracket 31 provided on the base 32 side, and a securing part 36, which is provided on the bracket positioned lengthwise on the side opposite the side on which these docking pins 30 are provided, are used to integrally mount and secure the punch unit 8 on the base 32 in a simple mating and securing operation. Further, FIG. 3 indicates the state when the punch upper guide plate 42, including the lateral registration sensor S2 (code 41 is used in FIG. 3), and the punch lower guide plate 43 are mounted; and FIG. 4 indicates the state when the punch unit 8 and the stay 33 are set up without these parts.

Meanwhile, a punch drive source of the punch unit 8, which is set up on the non-moving part of the perforating apparatus 100 and is a perforating device, and a drive source to be used when adjusting the lateral registration are mounted on the stay 33.

Figure 5:
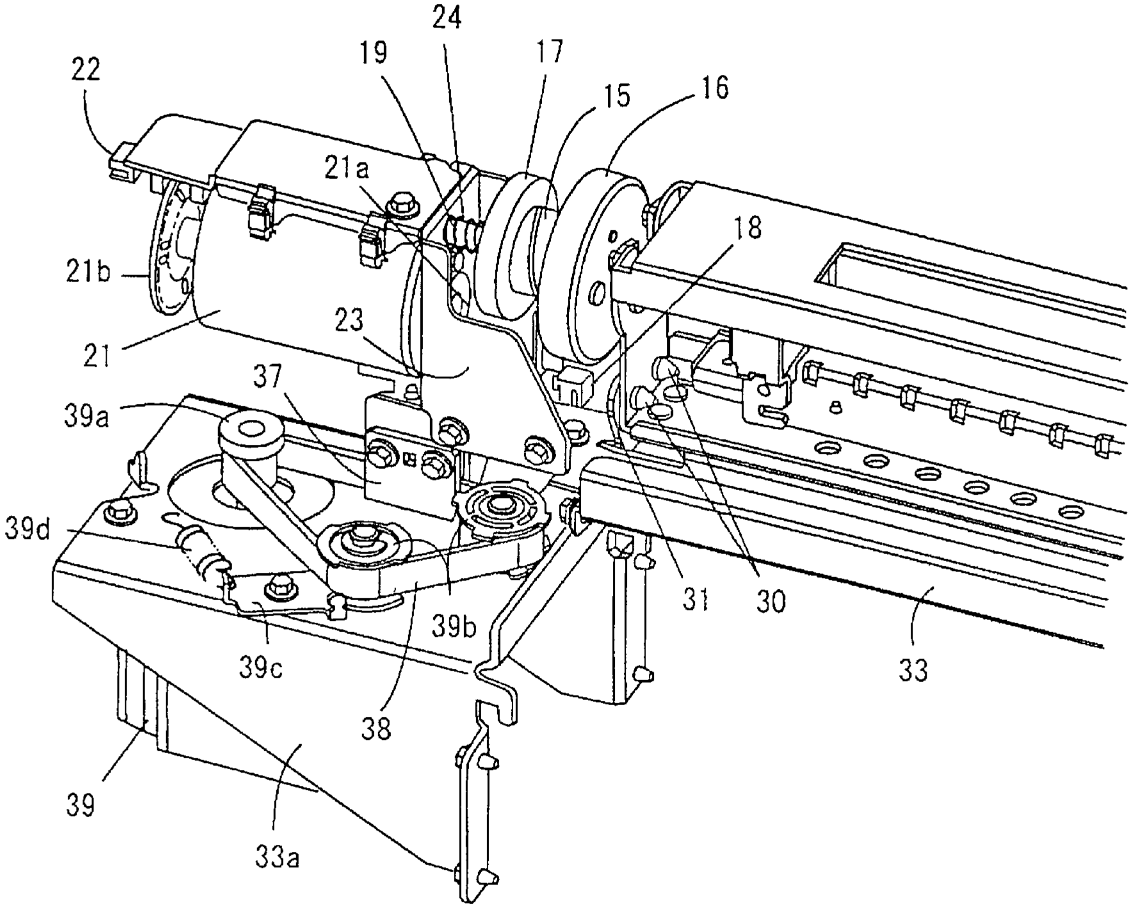
FIG. 5 is a perspective view indicating the drive part used in the lateral registration movement of the same punch unit, as well as the desired position detection structure during this movement.
Figure 6:
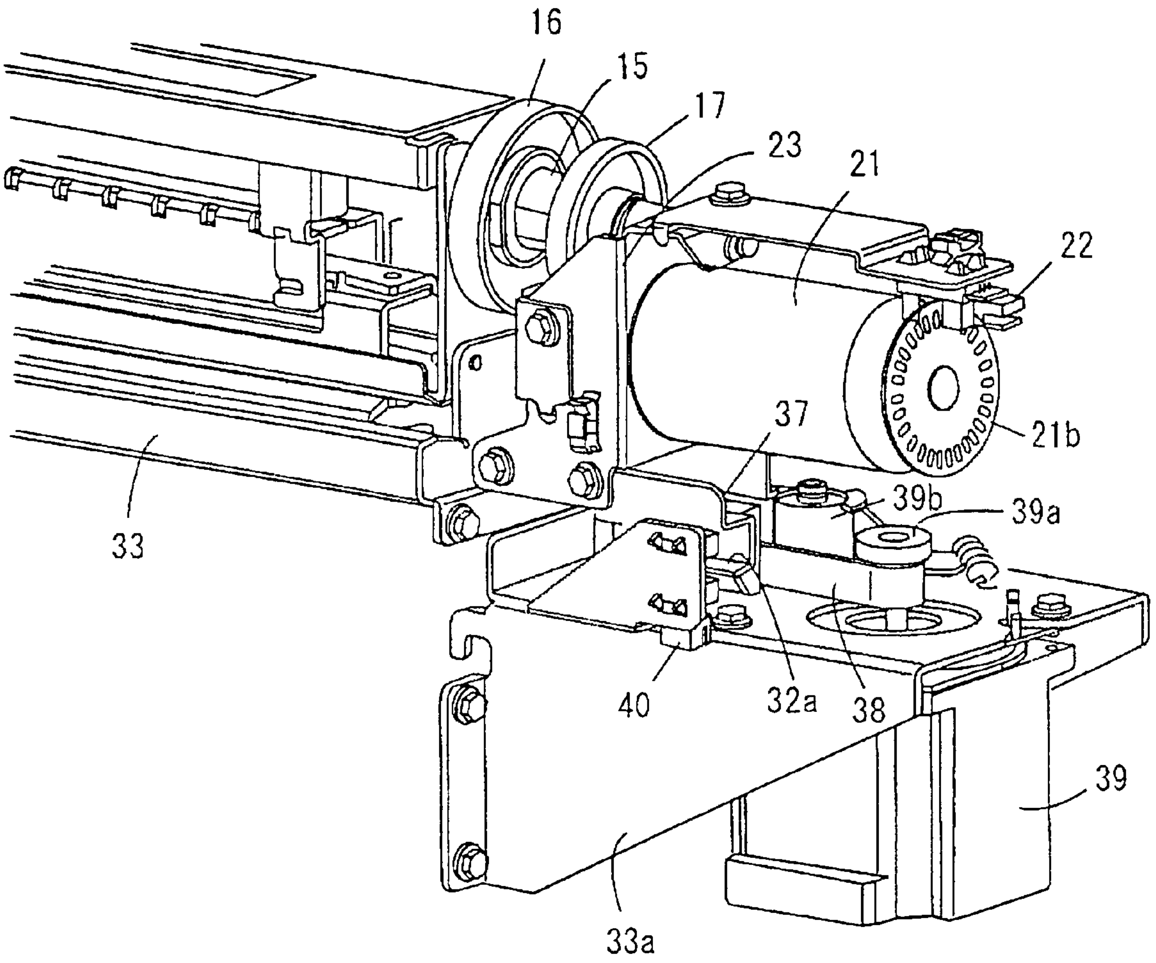
FIG. 6 is a perspective view indicating the same desired position detection structure shown in FIG. 5 seen from the opposite side of the direction indicated in FIG. 5.

FIGS. 5 and 6 are diagrams indicating the installation configurations of the drive sources in relation to the punch unit 8, and a servo motor 21 and a stepping-motor 39 are used as the drive sources, and are assembled on a bracket provided on one lengthwise end of the stay 33, in the present embodiment, on the end opposite the front side of the insertion direction of the punch unit 8.

The operations of both the servo motor 21 and the stepping motor 39 are controlled by the control unit 200 indicated in FIG. 19, and the servo motor 21 is used to drive the punch blade of the punch unit 8, and the stepping motor 39 is used to adjust the lateral registration of the punch unit 8, in other words, as the drive source of the slide mechanism.

The servo motor 21 is supported on a motor bracket 23 having a perpendicular surface provided on the end of the stay 33, and the stepping motor 39 is supported on a horizontal surface of a motor bracket 33*a* shaped like a downward channel provided on the end of the stay 33.

In FIG. 5, a motor gear 21*a* is assembled on the output spindle of the servo motor 21, and a ratchet gear 17 assembled on the end of a rotational spindle 24 supported by the motor bracket 23 is provided on the motor gear 21*a*.

The ratchet gear 17 will be explained in detail later, but a ratchet shaped cam ember 15 is integrated on the surface of the side opposite the punch unit 8, and this cam member 15 is energized in the direction of the punch unit 8 side by a spring 19 mounted on the rotational spindle 24. Based on the energization of the spring 19, the cam member 15 can mesh with the ratchet gear 17 assembled on the end of the rotational spindle on the punch unit 8 side at the rotational phase when the correlative shapes match.

Meanwhile, in FIG. 5, a pulley 39*a* is assembled on the output spindle of the stepping motor 39, which is used as the drive source when adjusting the lateral registration of the punch unit 8, and a timing belt 38 is rotationally hung between this pulley 39*a* and a plurality of pulleys 39*b* that are provided on the horizontal surface of the motor bracket 33*a*.

A securing plate 37 is provided on one of the extended parts of a timing belt 39, specifically on the extended part parallel to the direction of motion of the punch unit 8, and part of the base part 32 of the punch unit 8 is integrated with the securing plate 37. The base 32 can move reciprocally by connecting to the movement of the timing belt 38, and the amount of lateral registration can be adjusted by adjusting the amount of movement in this direction. Further, a swing lever 39*c* is integrated with one of the pulleys around which the timing belt 39 is rotationally hung, and tension is applied to the timing belt 39 by the energization of a spring 39*d* that is hung on the swing lever 39*c*.

In FIG. 6 the rotational phase of the servo motor 21 is detected by an encoder 21*b* assembled on the output spindle of the motor and an encoder sensor 22 arrange nearby, and the detection contents are output to the controller 200.

The desired position when the punch unit 8 is mounted is determined by the correlative relationship between a shade plate 32*a*, which is provided on the securing plate 37 secured to the base 32 side, and a home sensor 40, which is provided on the motor bracket 33*a* side and uses a photosensor; and when the control unit 200 judges that the punch unit 8 has reached the desired position from the home sensor 40, the stepping motor 39 moves based on the amount of lateral registration adjustment taking that position as the standard.

Figure 8:
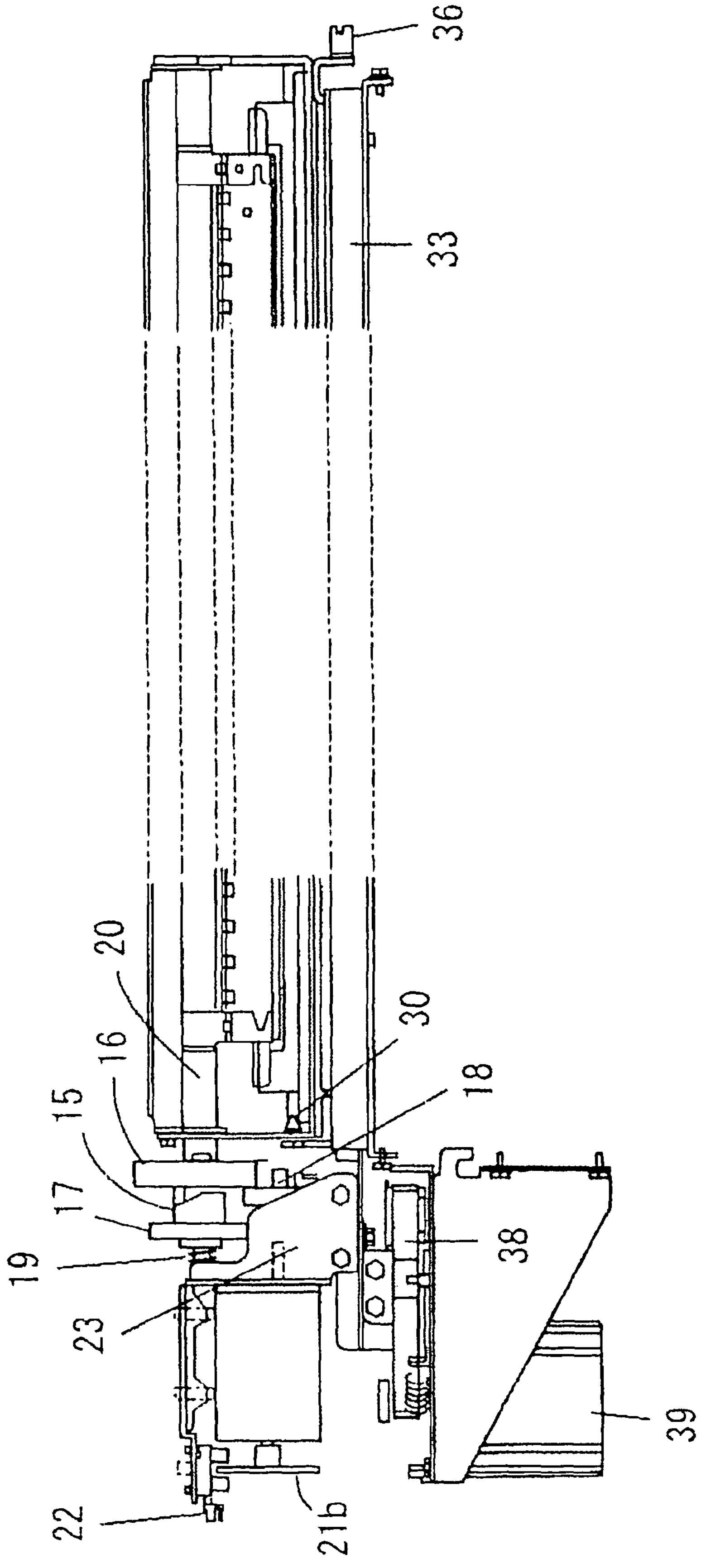
FIG. 8 is a front view diagram of the same punch unit seen from the paper transport direction.

FIG. 8 indicates the state when the punch unit 8 is mounted on the base 32 and inserted on the stay 33, and the desired position detection by the home sensor 40 has been completed. In this state, when determining the amount of lateral discrepancy when the paper has passed through the lateral registration sensor S2, the lateral registration is adjusted by the punch unit 8 moving at a right angle to the paper transport direction corresponding to the driving of the stepping motor 39.

Figure 9A:
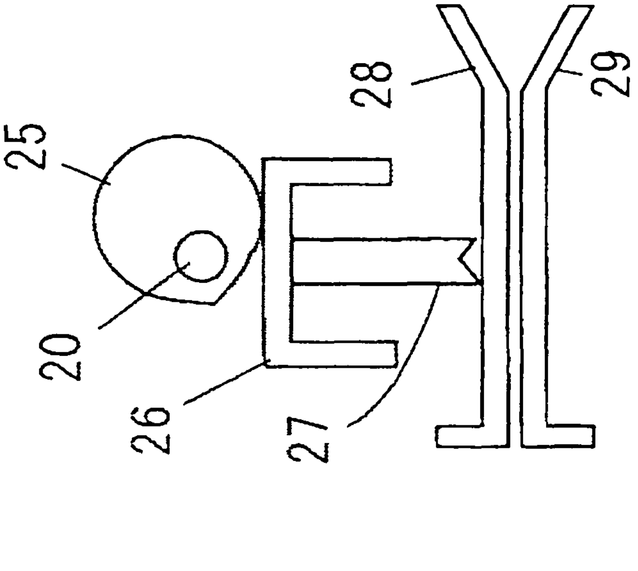
FIGS. 9A to 9C are diagrams to explain the state of the same punch unit during perforation.
Figure 9B:
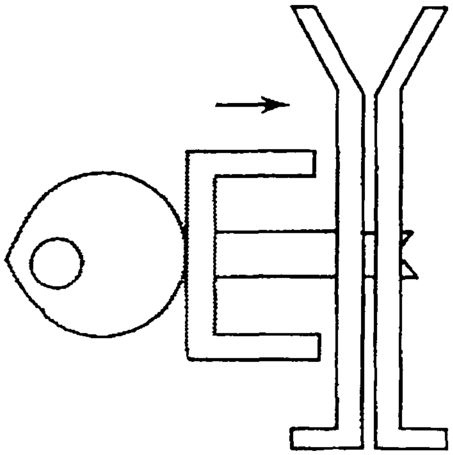

Meanwhile, as indicated in FIG. 8, a rotational spindle 20 is inserted through the housing of the punch unit 8, and as indicated in FIGS. 9A and 9B, an eccentric cam 25 is integrated with the rotational spindle 20.

Figure 9C:
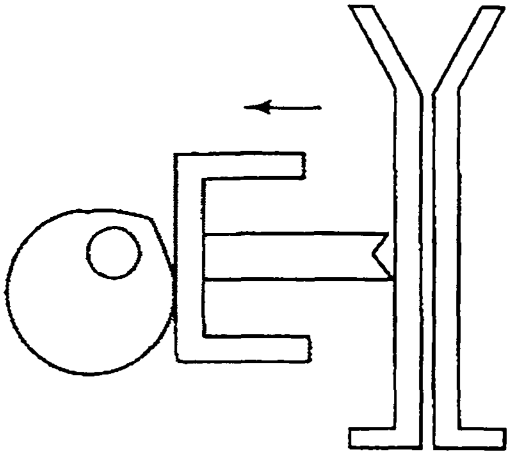
Figure 12:
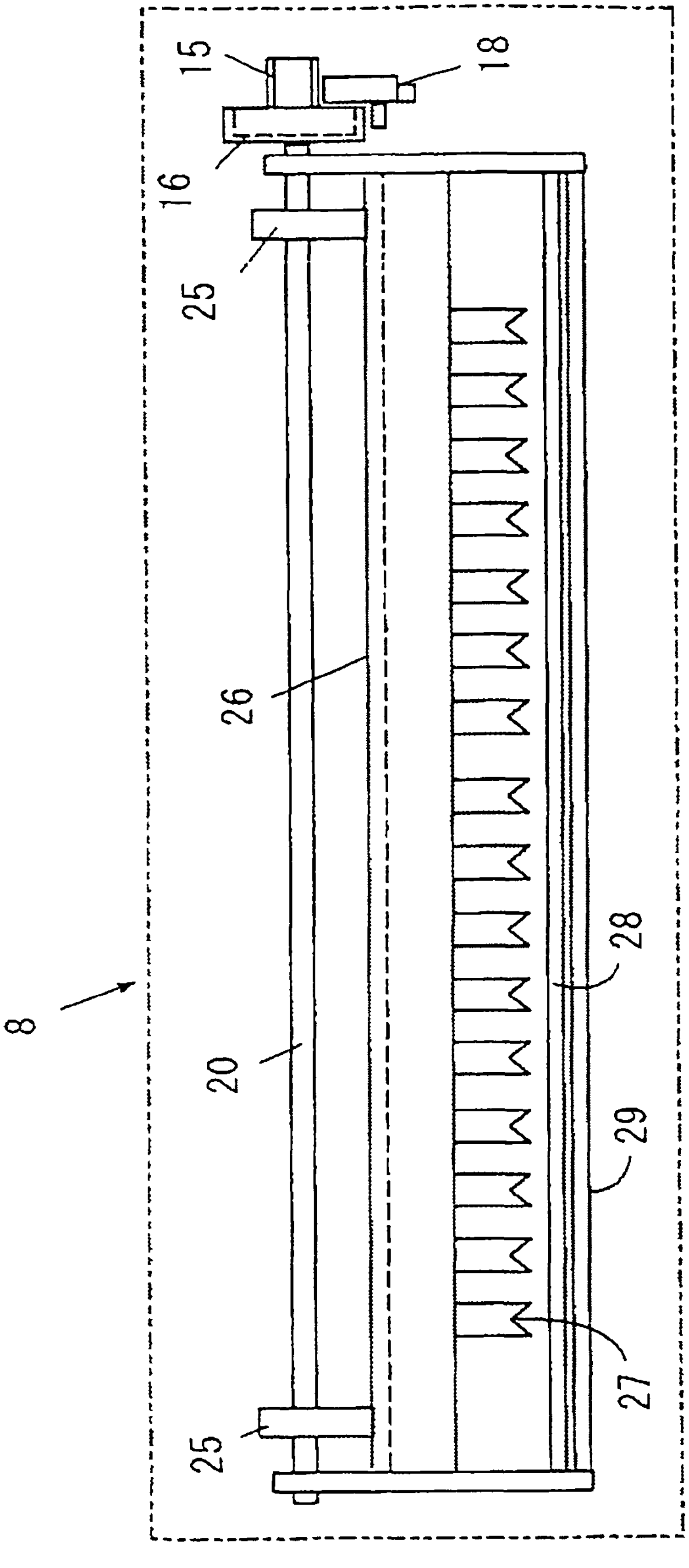
FIG. 12 is a schematic front view diagram indicating the relationship between the punch blade drive cam and the bracket of the same punch unit seen from the paper transport direction.

As indicated in FIG. 12, the eccentric cam 25 contacts the upper surface of a bracket 26 integrated with punch blades 27, and as indicated in FIGS. 9A to 9C, the paper positioned between a punch upper guide plate 28 and a punch lower guide plate 29 is perforated by rotating.

In the present embodiment a configuration is used for determining the desired position of the punch blades 27, that is, the position at which perforation to the paper can begin, or in other words, the state of beginning to protrude toward the paper, that is, the state in which perforation can begin.

This configuration uses the detection disk indicated by code 16 in FIG. 8, and the home position sensor 18 arranged on the stay 33 side in the vicinity of this detection disk 16.

Figure 11:
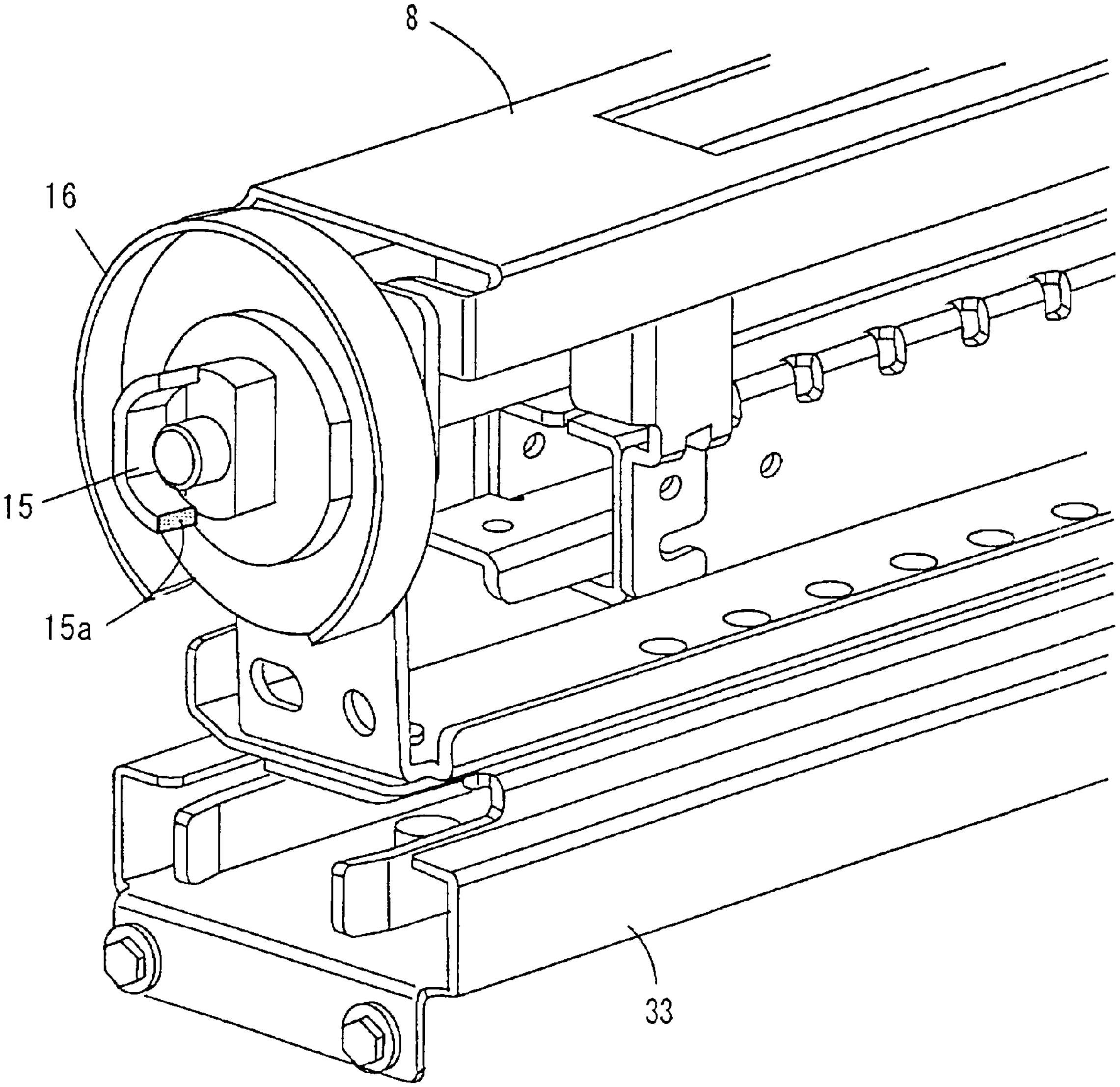
FIG. 11 is a perspective view indicating the configuration on the moving side of the drive mechanism of the same punch unit.
Figure 13:
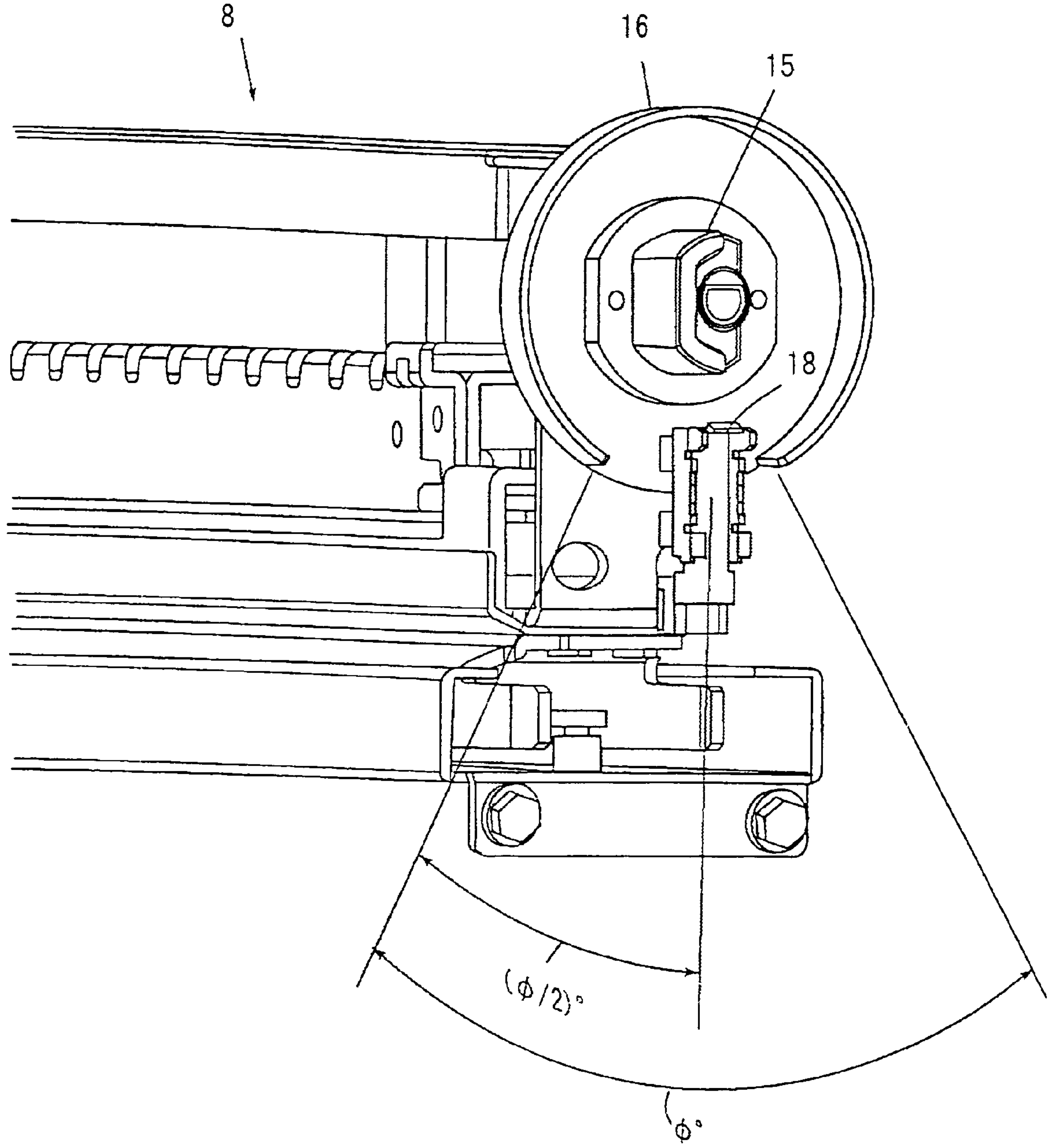
FIG. 13 is a perspective view indicating the home position set mechanism of the punch blade of the same punch unit.

FIGS. 11 and 13 are diagrams indicating the detection disk 16 and the home position sensor 18 in opposing views. The detection disk 16 is a member having a cap-shaped cross-sectional structure integrated with the end of the rotational spindle 20 that is inserted inside the punch unit 8, and a cutaway part 16*a* is formed in a part of the perimeter, that is, in a part of the circumference.

An optical sensor enclosed in the perimeter of the detection disk 16 is used for the home position sensor 18, and the position of the cutaway part 16*a* is detected by the difference in shading between the cutaway part 16*a* and the non-cutaway part.

With the detection disk 16, the position indicated in FIG. 13, specifically, the state when the cutaway part 16a is positioned below and corresponds to the home position sensor 18 is detected as the home position of the punch blades 27, and the intended position is for the home sensor 18 to be at the center of the cutaway part of the detection disk 16 (if the angle of the cutaway part is ϕ°, then the position at (ϕ/2)°) Because the perforation time and perforation speed differ depending on the thickness of the paper, the ambient temperature and the voltage, etc., the home position during all perforating must be at the position described above, but the cutaway part 16*a* is made such that, if the home position sensor 18 is stopped at the cutaway part 16*a* (range of ϕ°) of the detection disk 16, the punch blades 27 will not protrude from the punch upper guide plate 28.

If stopped beyond the cutaway part 16*a* of the detection disk 16, the leading edge of the punch blades 27 protrudes from the punch upper guide plate 28, and therefore, when the next paper is transported, it is possible for the leading edge to collide with or contact the punch blades 27 resulting in marks or jamming. In order to avoid this kind of situation, it is necessary to stipulate a home position that is the desired position of the punch blades 27, specifically, the position of the state at which perforating can begin.

After the stepping motor 39 has rotated one time, the home position sensor 18 that detects the cutaway part 16*a* stops the stepping motor 39 by entering into the cutaway part 16*a* again, and in the rotational process a pulse is output to the control unit 200 from the time of beginning to enter into the cutaway part 16*a* up to the time of no longer facing the cutaway part 16*a*.

The control unit 200 counts the pulses output by the encoder sensor 22 (refer to FIG. 6) from the time that the home position sensor 18 begins to detect the cutaway part 16*a*, takes as a standard the time at which the cutaway part 16*a* again begins to be detected by the home position sensor 18, and stops the stepping motor 39 at the time that matches half the number of pulses already counted. The rotational phase equivalent to the halfway position (ϕ/2) of the angle ϕ of the cutaway part 16*a* can thereby be obtained, and this is set as the start condition equivalent to the state at which perforation can begin without the punch blades 27 protruding from the punch upper guide plate 28.

The period that the home position sensor 18 detects the cutaway part 16*a* of the detection disk 16 is the period in which it is detected that the punch unit 8 is mounted on the stay 33. Specifically, when the punch unit 8 is mounted on the stay 33, the shade plate 32*a* that is on the base 32 (refer to FIG. 6) is sensed by the photosensor 40 (refer to FIG. 6) and position determination at the desired position is detected; and therefore detection of the home position of the punch blades 27 is conducted by taking the input of the detection signals from the photosensor 40 as the standard.

In the present embodiment, when detecting the home position of the punch blades 27, the servo motor 21 is rotationally driven by setting the speed to the speed at the time of perforation or less, so that the cutaway part 16*a* of the detection disk 16 is detected in that one rotation, but if on the contrary the cutaway 16*a* cannot be detected, the reverse rotation is set. This is for the purpose of judging whether of not paper is remaining as is without advancing to the punch unit 8. Specifically, if thick paper that the punch blade has difficulty passing through remains in the punch unit 8, even with the detection plate 16 correctly rotating, the cause is that the punch blades 27 remains striking the paper and does rotate once, thereby rendering detection of the cutaway part 16*a* impossible.

Thus, in the present embodiment power is supplied to the servo motor 21 taking the time required for one rotation as a standard, and if the cutaway part 16*a* cannot be detected within that time, rotation is reversed; and if the cutaway part 16*a* cannot be detected during reverse rotation, the judgment is made that paper is remaining in the punch unit 8. Remaining paper can be detected even if no configuration is provided in the punch unit 8 for detection of remaining paper.

Figure 10:
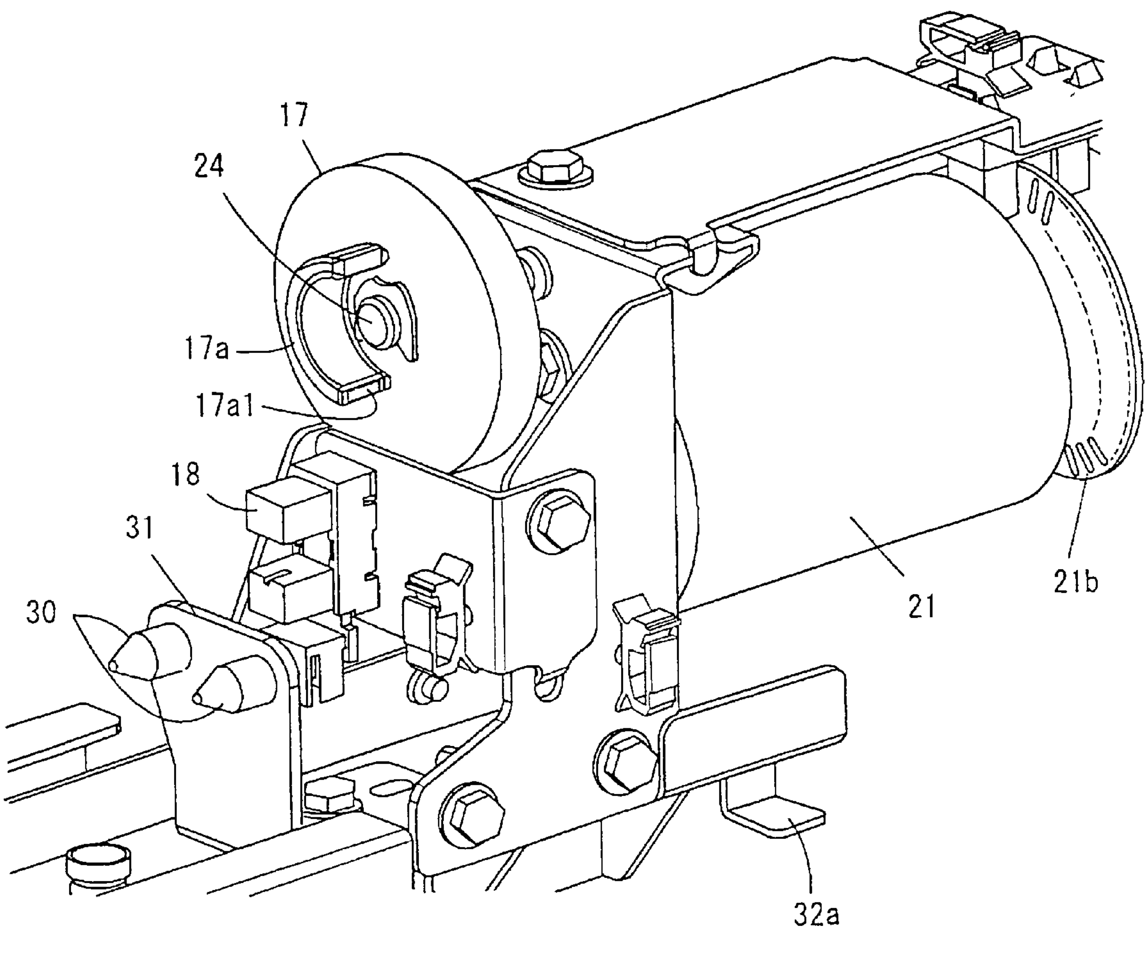
FIG. 10 is a perspective view indicating the structure on the main unit side of the drive mechanism of the same punch unit.

Meanwhile, in FIG. 13, a ratchet-shaped cam 15 is coaxially provided and integrated with the detection disk 16, and as indicated in FIG. 10, a ratchet-shaped cam 17*a* is coaxially provided and integrated with the ratchet gear 17 on the opposing servo motor 21 side.

Figure 14:
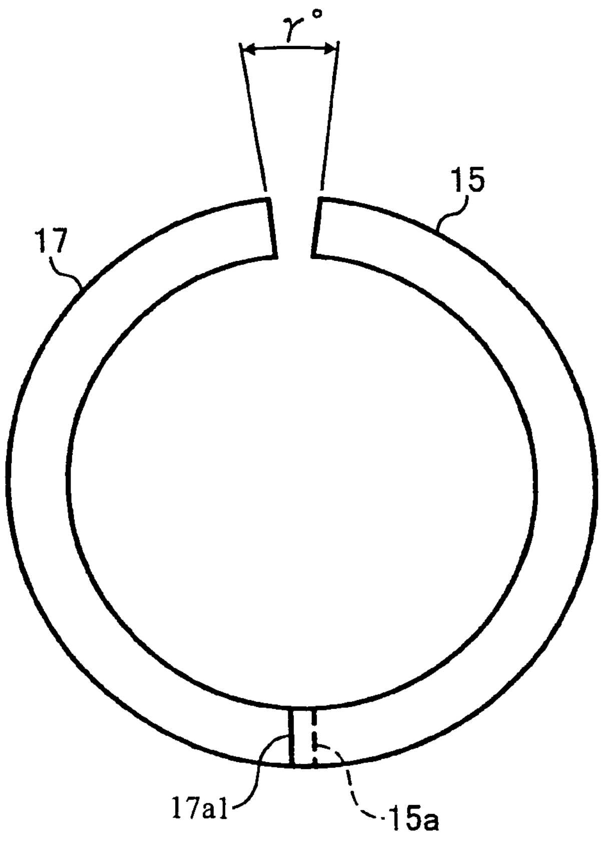
FIG. 14 is a diagram indicating the fundamental configuration for the initialization operation by the drive mechanism mounted in the same punch unit.

As indicated in FIGS. 10 and 13, the cams 15 and 17*a* have correlative halved circumferential shapes, and as indicated in FIG. 14, the meshing surfaces 15*a* and 17*a*1 mesh by making mutual opposing contact when the correlative shapes match in the rotational phase, and drive force can be transmitted. Therefore, if the correlative shapes do not agree in the rotational phase, the pair of cams pass over; and if, when the punch unit 8 is mounted on the stay 33, the rotational speed of the servo motor 21 is set to the speed during perforation or less, and the correlative shaped cams agree in the process of detecting the cutaway part 16*a* of the detection disk 16, the end surfaces of the pair of cams mesh based on the energization of the spring 19 mounted on the rotational spindle 24, and drive force can be transmitted between the two.

FIG. 14 is a front view diagram indicating the state when the pair of cams 15 and 17 has meshed, and in the diagram the cams are of a size that can make a sufficient gap to obtain an angle γ° between one set of the circumferential end surfaces, and based on the presence of this gap, meshing can take place smoothly by the cam on the side that has passed over easily falling into the cam on the side that does not pass over. The rotation of the ratchet gear 17 is thereby transmitted through the cam 17 and the cam 15 meshed therewith to the eccentric cam 20 for driving the detection disk 16 and the punch blades 27.

In the present embodiment, information for recognizing the type of replacement punch unit 8 can be setup in the detection disk 16 for home position detection of the punch blades 27.

Specifically, as indicated in FIGS. 20A, 20B, 21A, 21B, 22A, and 22B, separate from the cutaway part 16*a* for home position detection, supplementary cutaway part 16*b* is provided on the detection disk 16 in a different shape than that of the cutaway part 16*a* and in a different position than that of the cutaway part 16*a*.

Figure 20B:
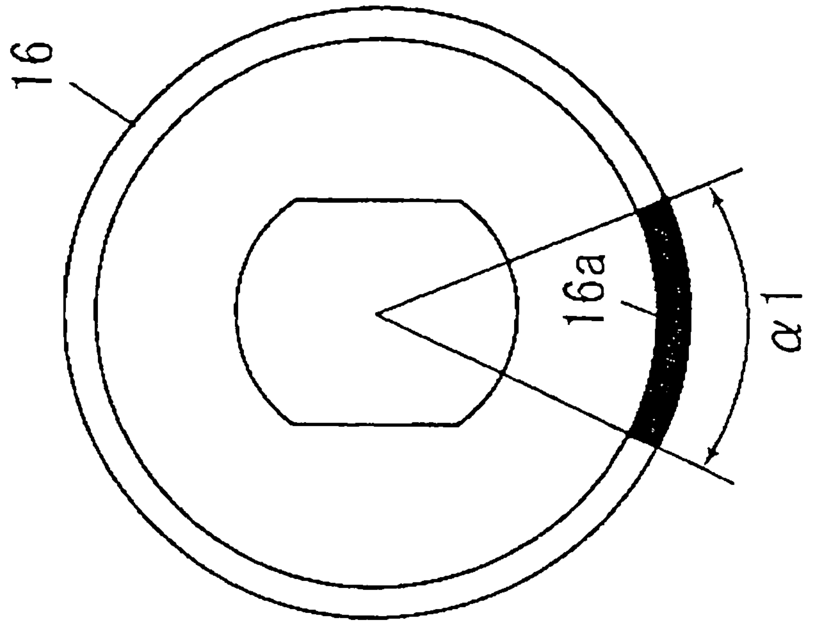
FIGS. 20A and 20B are diagrams indicating the shape of the cutout for home position detection formed in the detection disk used in the perforating apparatus.
Figure 20A:
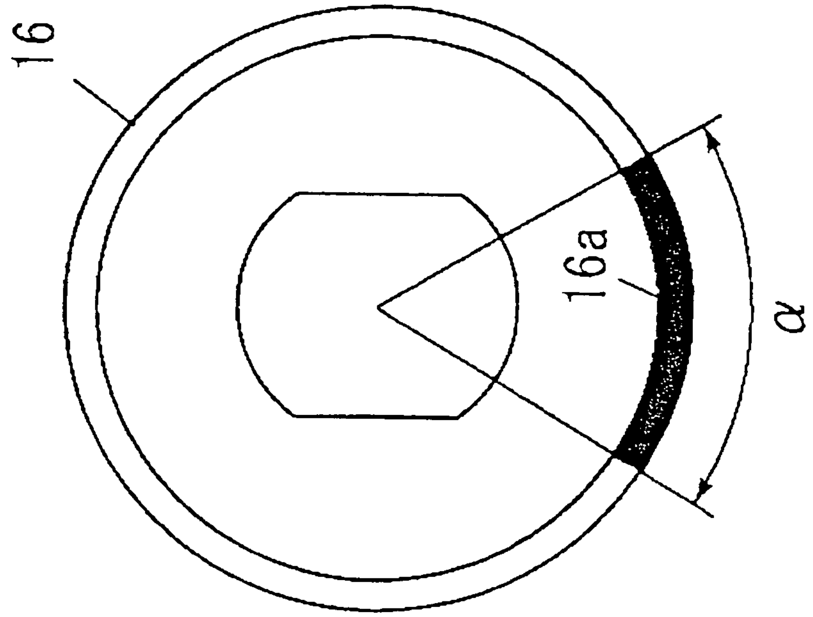
Figure 21A:
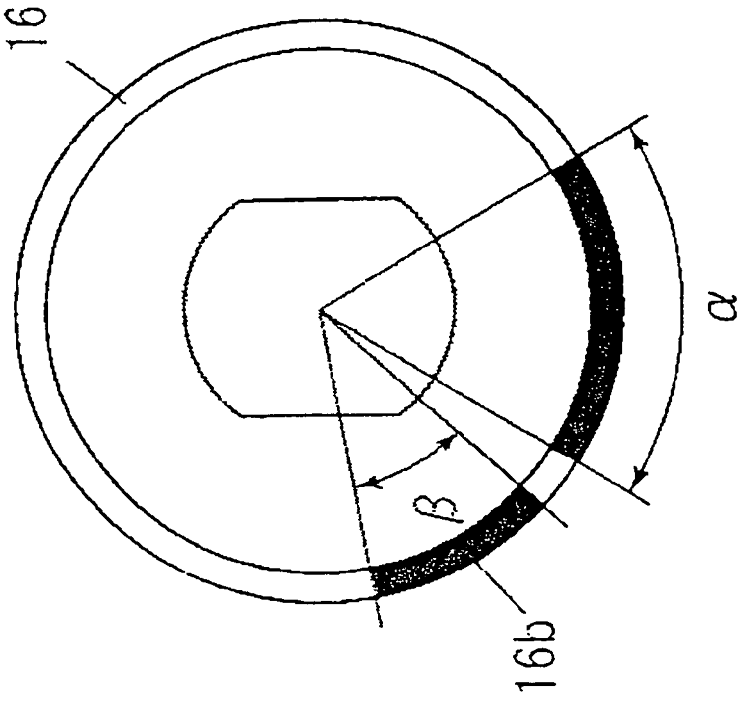
FIGS. 21A and 21B are diagrams indicating one example relating to the configuration to execute perforation device type recognition focusing on the detection disk indicated in FIGS. 20A and 20B.
Figure 21B:
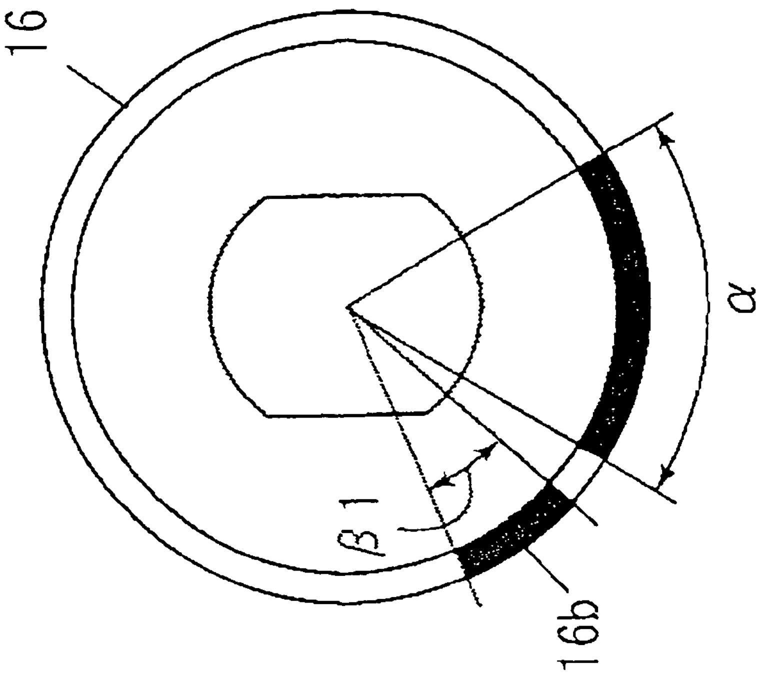

FIGS. 20A and 20B indicate when the cutaway angles (angles indicated by codes α, α1) of the cutaway part 16*a* for home position detection of the punch blades 27 are different, and as indicated in FIGS. 21A, 21B, 22A and 22B, shapes (FIGS. 21A, 21B) or a plurality of cutaways (FIGS. 22A, 22B) are provided in different positions than that of the cutaway part 16a for home position detection, and in different angle positions (positions indicated by codes β, β1).

The home position sensor 18 identifies information relating the number of holes and the hole positions by detecting the cutaways parts 16*a* and 16*b* in the process of the detection disk 16 rotating once, and outputs signals to the control unit 200 for adjustment of the position in the direction of the punch unit 8 in the lateral registration direction based on this information. Classification of the punch unit 8 mounted on the stay 33 thereby becomes possible, and because the condition setting of the punch holes to be perforated can be automatically conducted by the mounted punch unit 8, in contrast to when a user sets the perforation conditions every time a punch unit 8 is mounted, setting mistakes and the like can be eliminated.

In this regard, in the present embodiment, to handle the various types of information input into the control unit 200, the information acquisition operation is not conducted again until the operation to discard the information identified by the home position sensor 18 is conducted, for example, when the punch unit 8 is displaced from the desired position by removing the punch unit 8. In this way, until the punch unit 8 is newly replaced, frequent recourse to a speed slower than when perforating as set by the operation of the home position sensor 18 is prevented, and the perforation operability is not worsened.

Moreover, if home position sensor 18 cannot detect the cutaway parts 16*a* and 16*b* during one rotation of the detection disk 16, a warning is issued to the user, who can confirm whether or not the equipment conditions are inadequate.

When the perforation operation is being conducted using this kind of drive mechanism, punch debris 45 resulting from perforation is generated as indicated in FIG. 7. In the present embodiment, after perforation the punch debris 45 passes through a punch debris guide 44 in FIG. 7 and is collected in a hopper 46. The collection conditions are as in FIG. 1.

In this kind of configuration, because the punch unit 8 is arranged on the lowest horizontal part of the roughly U-shaped perforation transport route A, it is enough-for the perforated punch debris 45 to fall straight down. At that time, only passage to the base 32 at punch debris guide 44 needs to be guaranteed.

Because the present embodiment has the foregoing configuration, the action will be explained as follows using the flowcharts indicated in FIGS. 23A, 23B, 24A, 24B, 25A to 25C, 26, 27A, 27B, 28A and 28B. Further, in the steps of the flowchart, it is assumed that HP sensor represents the home position sensor when detecting the cutaway part 16*a* for home position detection.

These flowcharts are subroutines related to processing when the punch unit 8 has been replaced, which in the main routine relate to processing to be executed by the control unit 200 indicated in FIGS. 17A to 17E; and this processing corresponds to the initialization operation in the main routine (Initialize indicated by the code ST2 in FIGS. 17A to 17E).

FIGS. 23A, 23B, 24A and 24B indicate the processing for detecting the cutaway part 16*a* of the detection disk 16 (refer to FIG. 13) and for identifying the information relating to the type of punch unit 8 mounted, specifically, the number of holes and the hole positions; and FIGS. 25A to 25C, 26, 27A, 27B, 28A and 28B indicate the processing for judging the mounting status of the punch unit 8 when replacing, specifically, whether or not the mounting to the desired position is suitable, and for judging that paper is remaining in the punch unit 8.

Figure 23A:
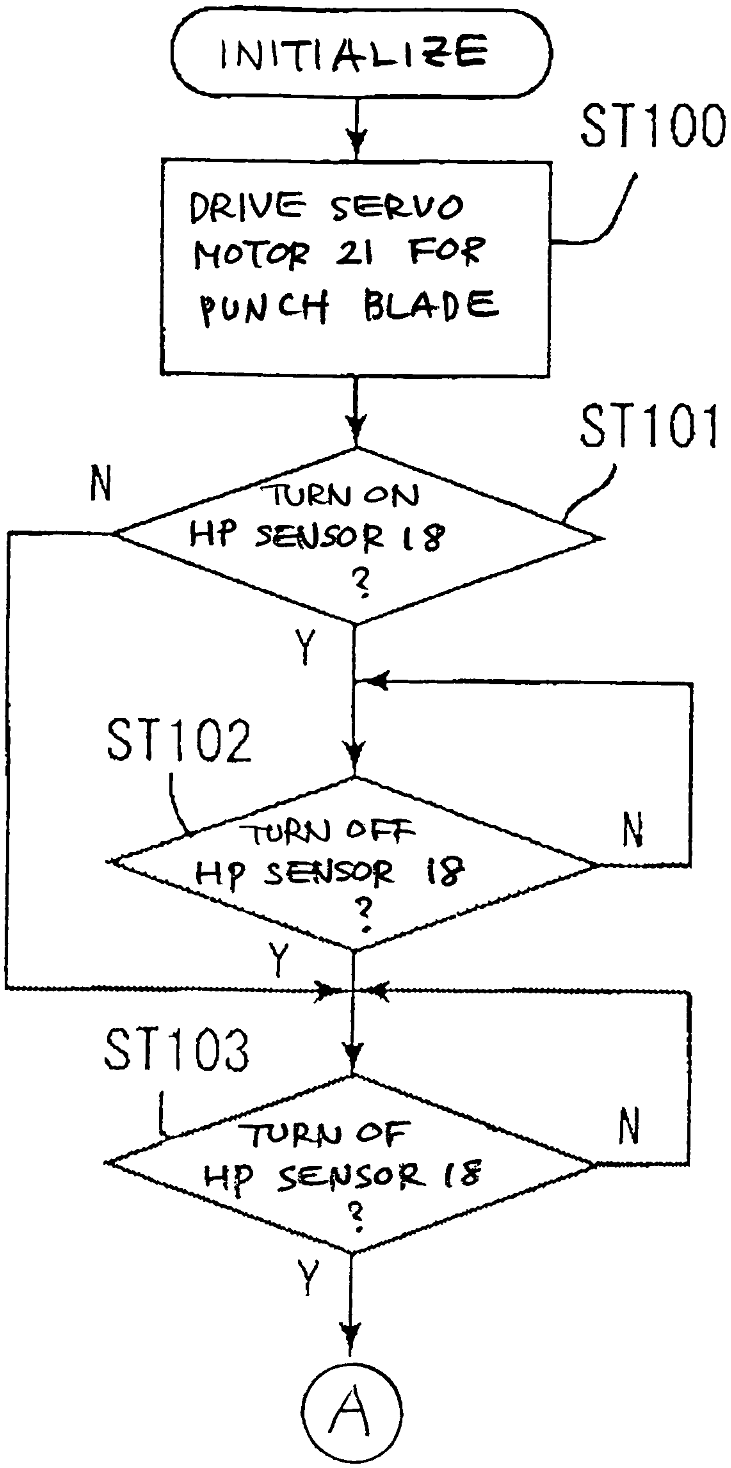
FIGS. 23A and 23B are flowcharts indicating one example of processing to determine the type of perforation device that is executed by the control part indicated in FIG. 19.
Figure 23B:
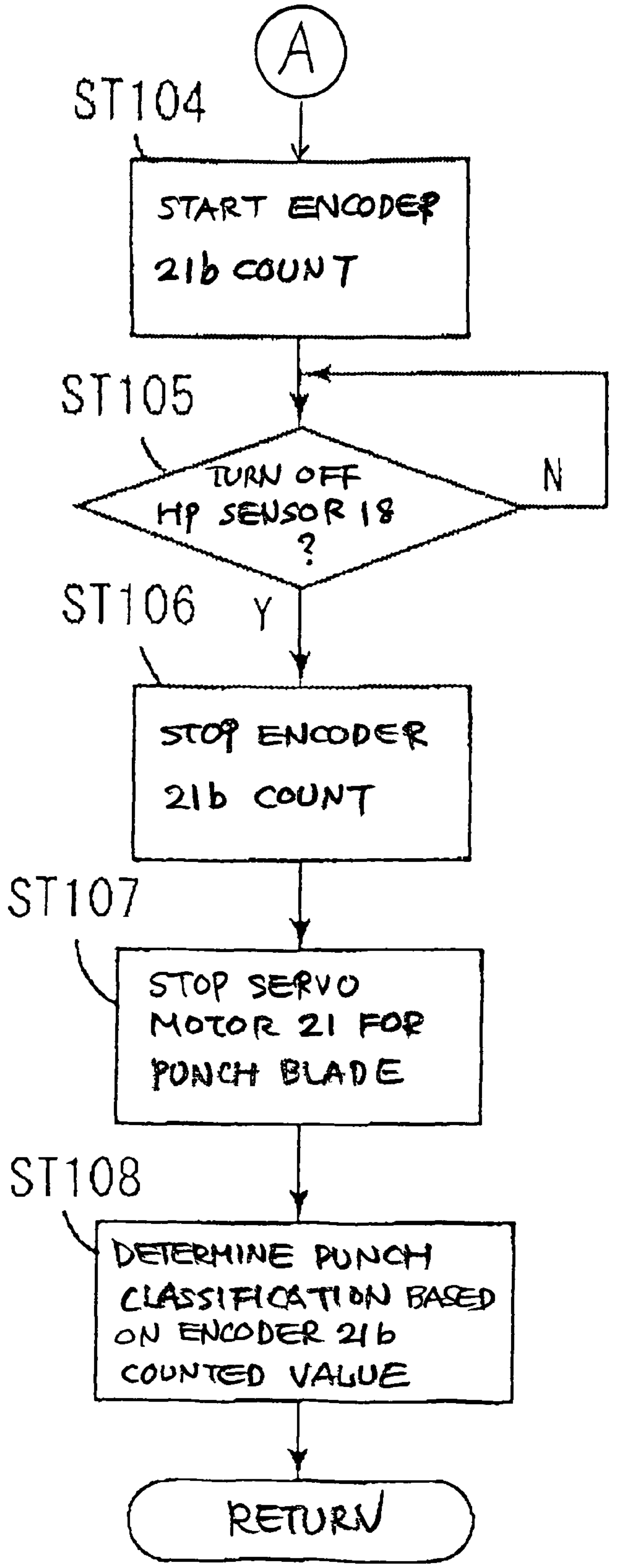

In FIGS. 23A and 23B, when starting to drive the servo motor 21, which is the drive motor of the punch blades 27, at a lower speed than when perforating (ST100), the detection disk 16 begins with 1 rotation, and in this process, detection of the cutaway part 16*a* is determined using the home position sensor 18 (ST101, 102, 103).

When home position sensor 18 detects the cutaway part 16*a*, the size of the cutaway part 16*a* is determined by the encoder 21*a* and the encoder sensor 22, and this cutaway part 16*a* size determination is continuous until the cutaway part 16*a* passes through and the encoder sensor 22 is shaded (ST104, 105, 106).

When cutaway part 16*a* detection is complete, the servo motor 21 is stopped (ST107), and the punch type is classified by identifying the information relating to the replaced punch unit 8, specifically, the number of holes and the hole positions, based on the size of the detected cutaway part 16*a* (ST108). The conditions for adjusting the desired position in the lateral registration direction of the punch unit 8 are set in step ST108 based on categorized numbers of holes and hole positions. Specifically, the amount of movement for setting a new central position in the array direction of the punch blades 27 is set corresponding to the array conditions of the punch blades 27 that are on the punch unit 8.

Figure 24A:
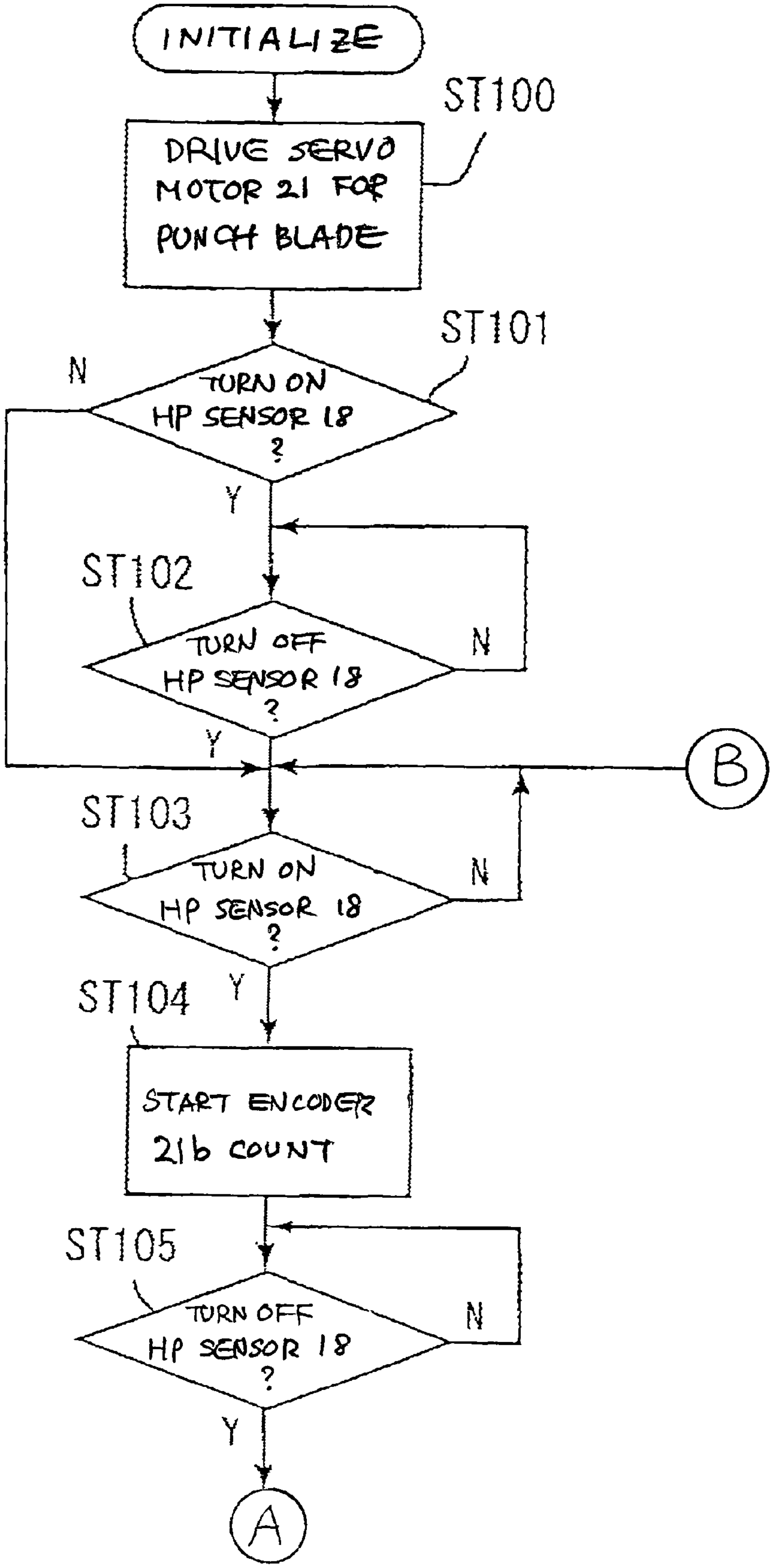
FIGS. 24A and 24B are flowcharts indicating another example of processing to determine the type of perforation device that is executed by the control part indicated in FIG. 19.
Figure 24B:
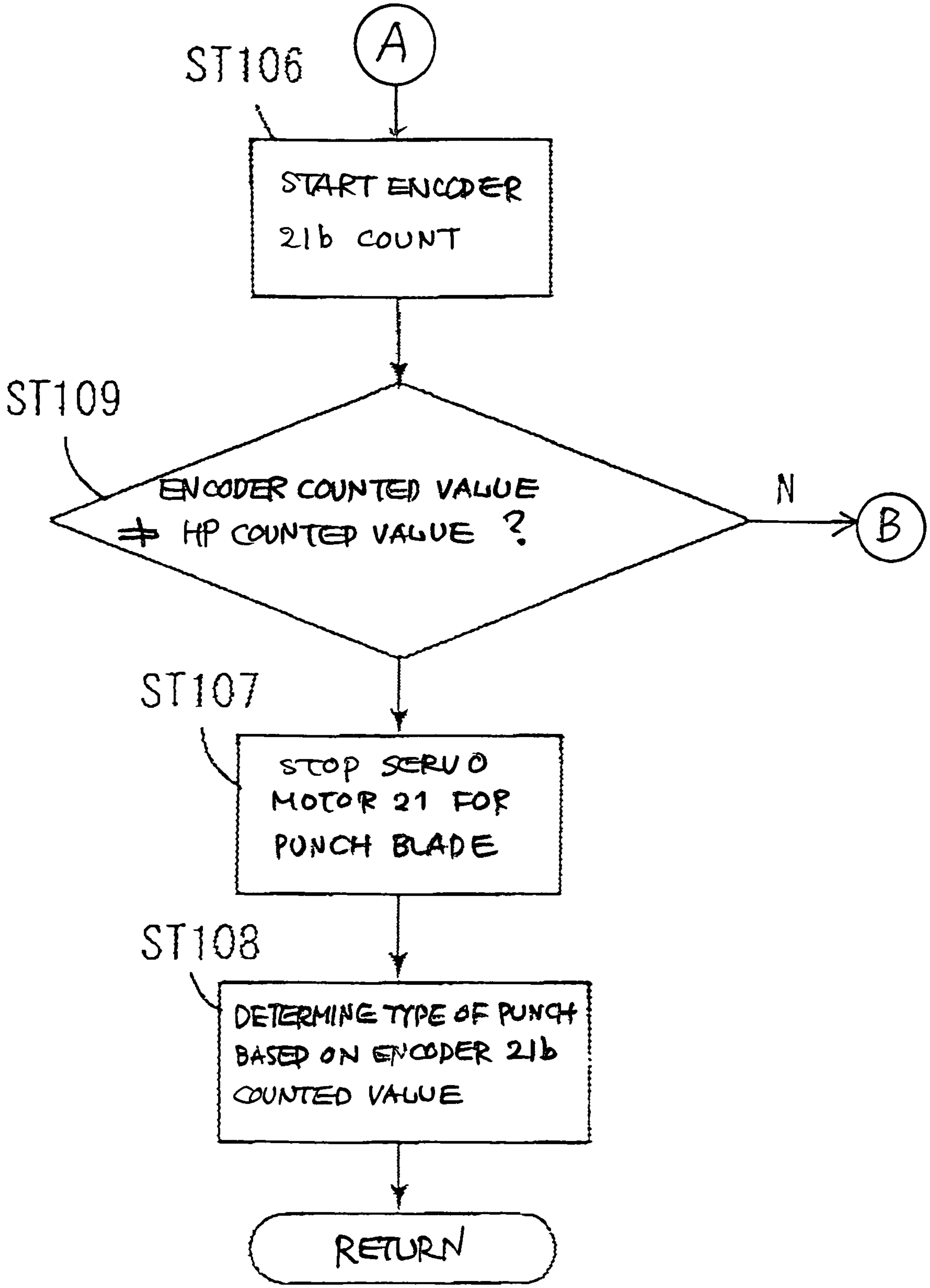

FIGS. 24A and 24B are processing when a supplementary cutaway part 16*b* (refer to FIGS. 21A and 21B) that differs from the cutaway part 16a for home position detection is provided, and in these diagrams, the same processing content as that in FIGS. 23A and 23B is indicated by the same codes.

In FIGS. 24A and 24B, the content indicated in code ST109 differs from the content in FIGS. 23A and 23B.

This processing judges whether or not the cutaway size information using encoder 21*b* differs from the size of the cutaway part 16*a* for detecting home position, and if different, that content is read and used to classify the punch type. The supplementary cutaway part 16*b* indicated in FIGS. 21A and 21B may be used for the cutaway configuration formed on the detection disk 16 in this case.

Figure 22B:
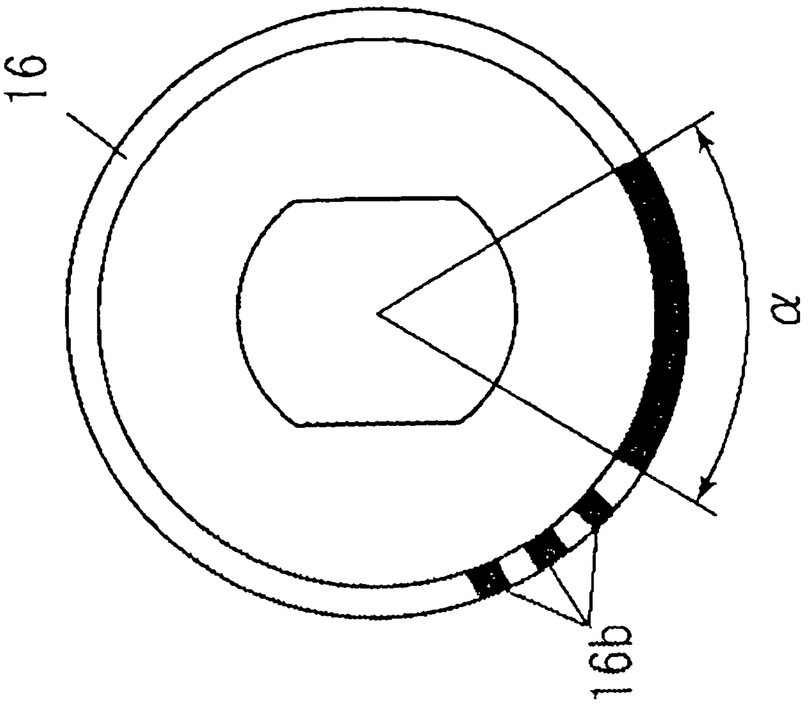
FIGS. 22A and 22B are diagrams indicating another example relating to the configuration to execute type recognition of the perforation device, targeting the detection disks indicated in FIGS. 20A and 20B.
Figure 22A:
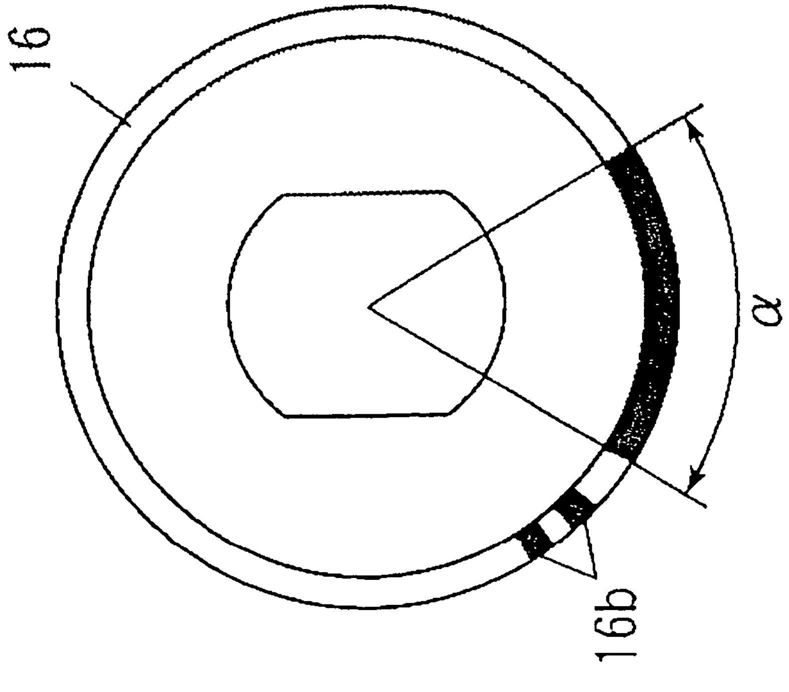
Figure 25A:
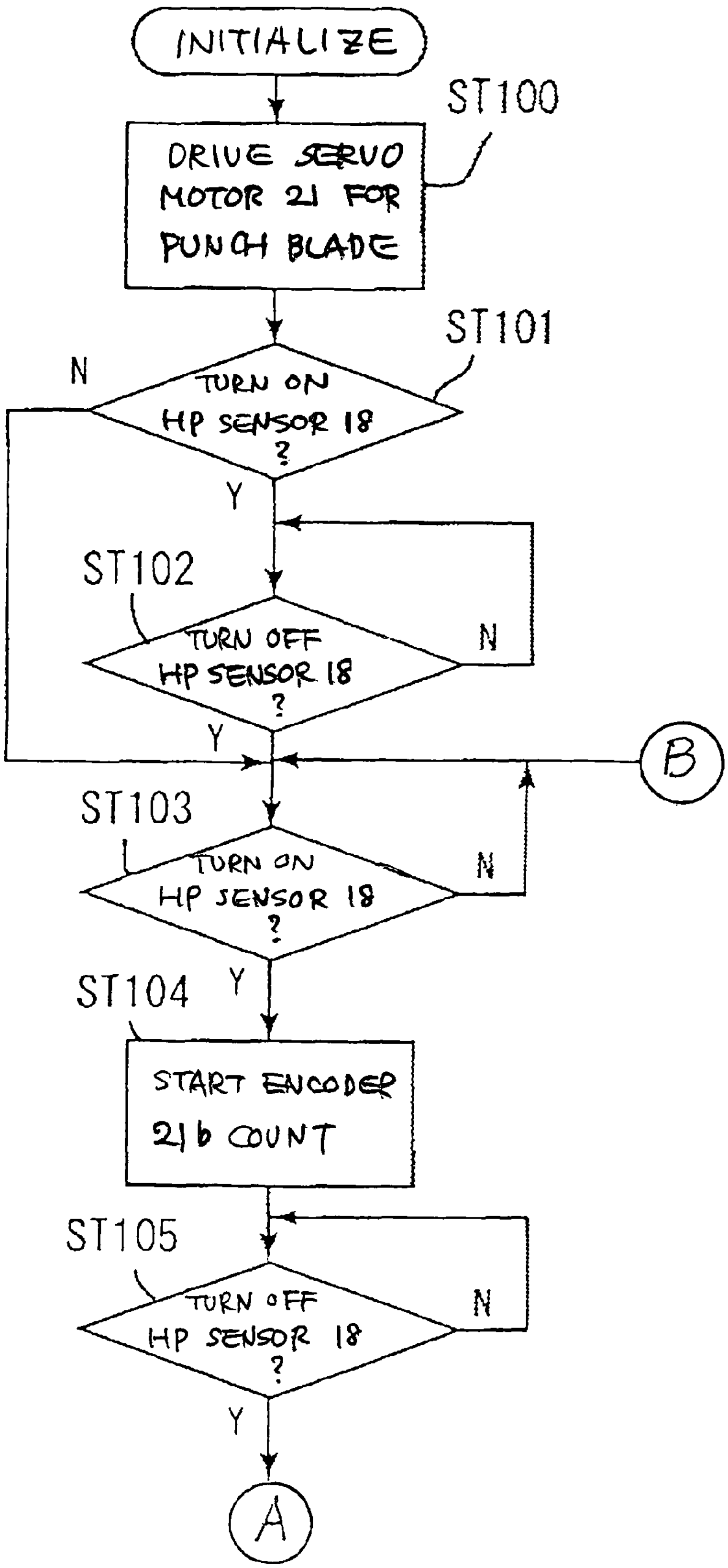
FIGS. 25A to 25C are flowcharts indicating yet another example of processing to determine the type of perforation device that is executed by the control part indicated in FIG. 19.
Figure 25B:
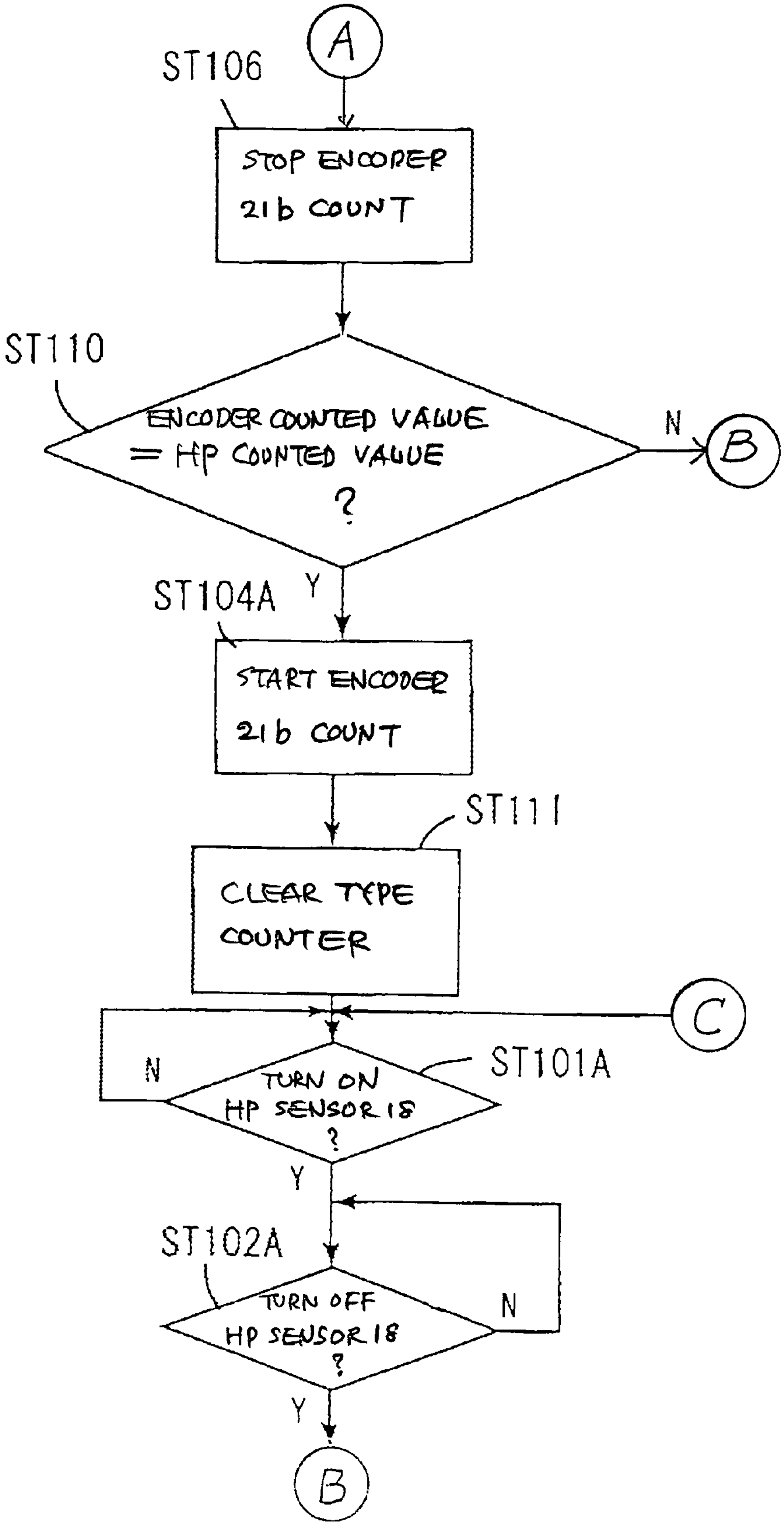
Figure 25C:
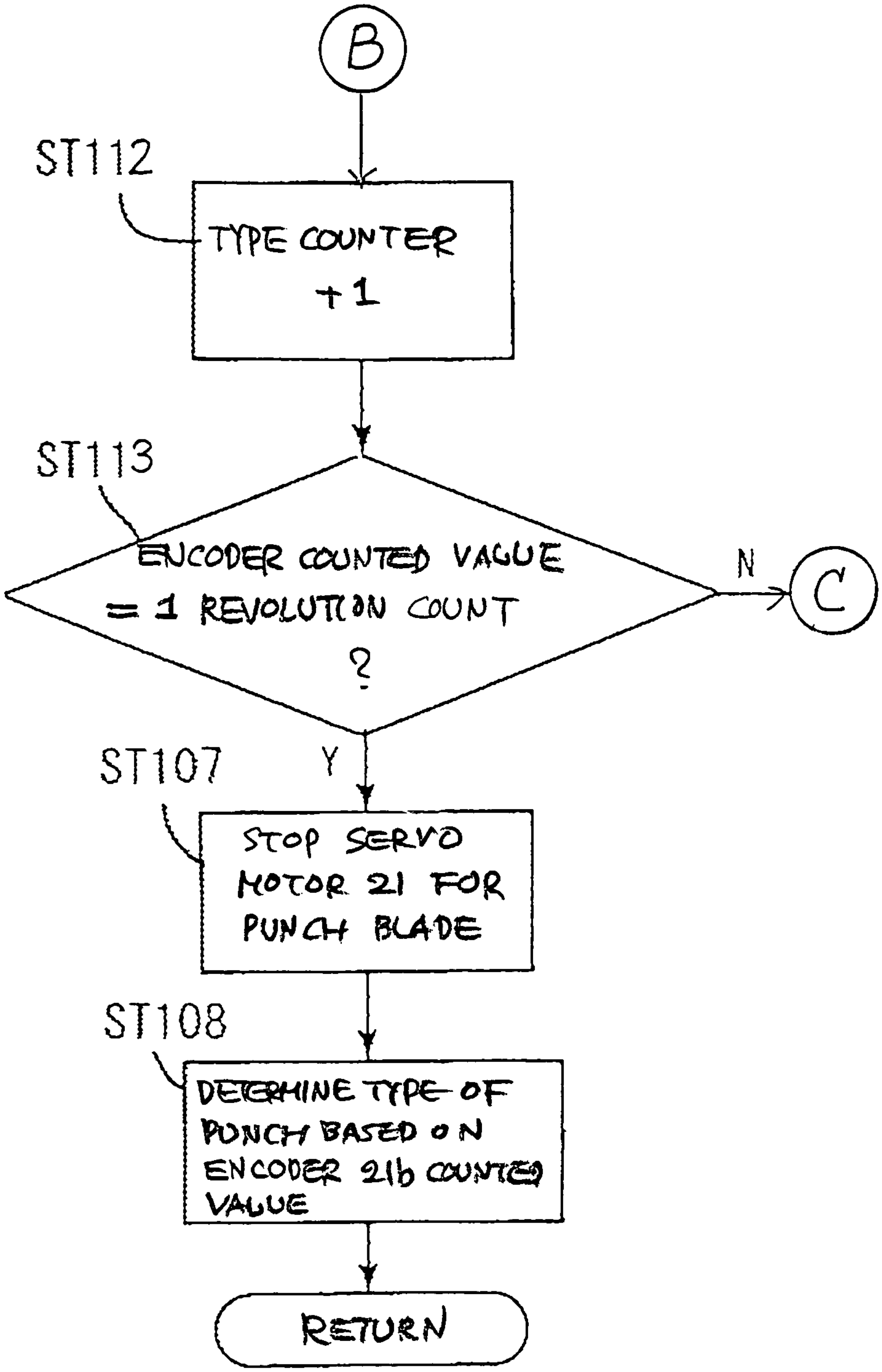

FIGS. 25A and 25B are processing for when multiple supplementary cutaway parts 16*b* are provided at positions different from that of the cutaway part 16*a* for detecting home position, as indicated in FIGS. 22A and 22B. Further, in FIGS. 25A and 25B the same processing content as that indicated in FIGS. 23A and 23B is indicated by the same codes.

In FIGS. 25A and 25B, the content indicated in codes ST110, 111, 112, and 113 differs from the content of FIGS. 23A and 23B. If determining that the cutaway part size using the encoder 21*b* is the same size as the cutaway part 16*a* for detecting home position, the processing determines that this is not the supplementary cutaway part 16*b* for classification determination, and clears the type counter up that point so that a new classification determination can be conducted (ST110, ST111).

Subsequently, the type count is counted up each time a new cutaway part is detected on the detection disk 16 rotation process (ST112). If the detection disk 16 using the encoder 21*b* has completed 1 rotation (ST113), the type of punch unit 8 is decided based on the value counted by the type counter, and as indicated in FIGS. 23A and 23B, the amount of movement for setting a new central position in the array direction of the punch blades 27 is set corresponding to the array conditions of the punch blades 27 that are on the punch unit 8.

In this regard, using the detection disk 16 to determine the type of punch unit 8 as described above assumes that drive transmission to the detection disk 16 is being conducted normally. However, when replacing the punch unit 8, the mounting conditions may not be complete and the rotational drive force from the power source to the detection disk 16 may not be transmitted normally. Thus, prior to deciding on the type of punch unit 8 based on the detection disk 16, the system determines whether or not conditions for transmitting the drive force to the punch unit 8, specifically, the conditions of the connection between the punch unit 8 and the drive source, are normal.

FIGS. 26, 27A, 27B, 28A, and 28B are flowcharts indicating the processing executed in the routine to execute initialization processing in FIGS. 17A to 17E.

Figure 26:
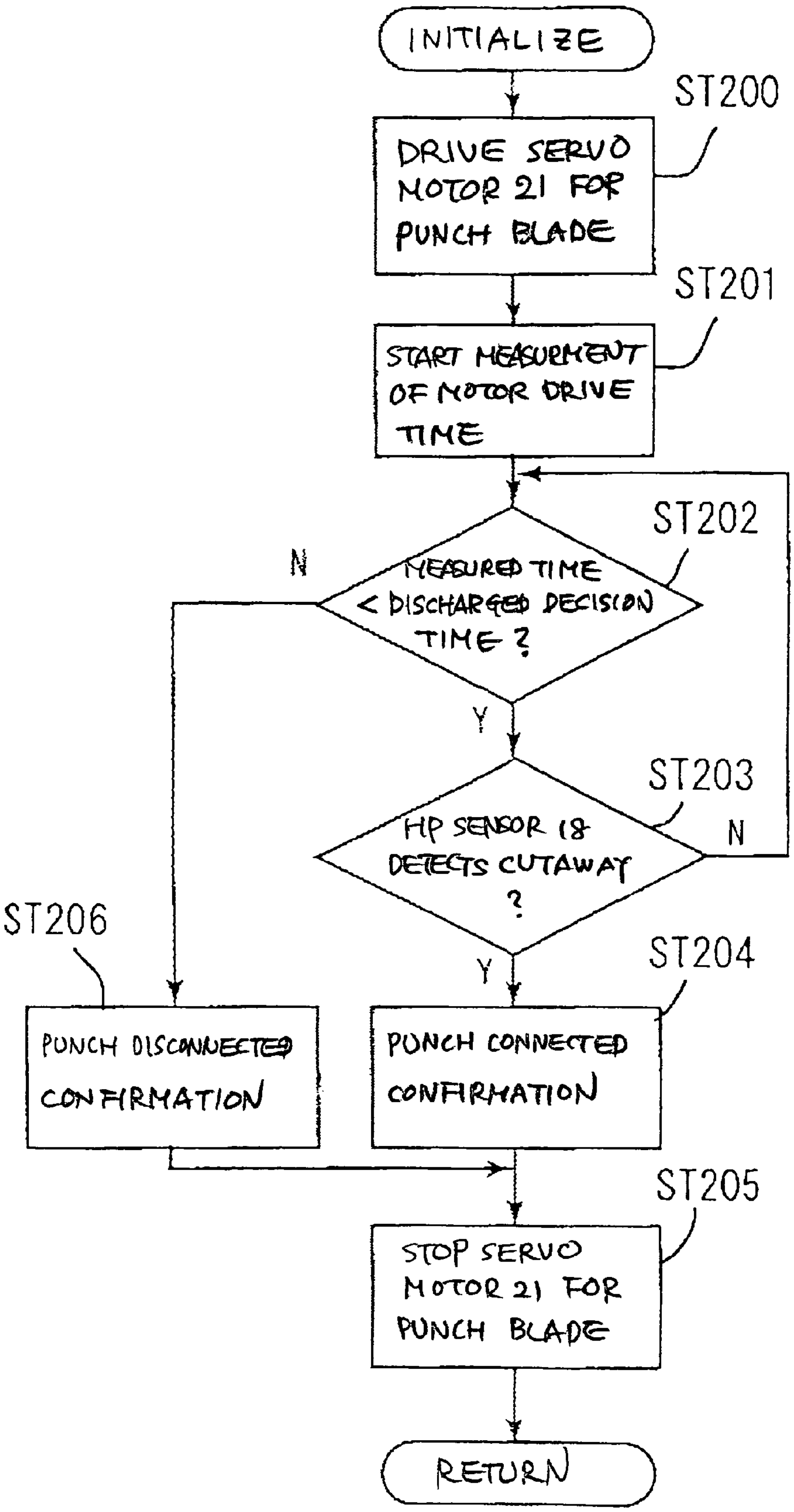
FIG. 26 is a flowchart indicating one example relating to processing to determine the drive transmission continuation state of the perforation device that is executed by the control part indicated in FIG. 19.

In FIG. 26, when the servo motor 21 for punch blade drive is driven at a speed lower than that when perforating (ST200), the motor continues to drive for a fixed time (represented as the disconnected decision time in FIG. 26), and that drive time is calculated (ST201). It is determined whether or not the motor drive time (in this case, the time for the detection disk 16 to rotate 1 time) is achieved (ST202), and if achieved in the fixed time, it is determined whether or not the cutaway part 16*a* for home position detection of the detection disk 16 has been detected (ST203).

If the cutaway part 16*a* for home position detection is detected in step ST203, it is determined that the drive force transmission of the punch unit 8 by the drive source is being conducted normally, that is, that connection has been confirmed (ST204), and the servo motor 21 is stopped (ST205). In this case, the cutaway part 16*a* of the detection disk 16 is detected in the one rotation process of the motor, in other words, normal transmission of drive force from the drive source to the detection disk 16 is possible, and it can be determined that the punch unit 8 connection is normal.

Meanwhile, if the drive time of the motor 21 at Step ST202 exceeds the time of one rotation, it can be determined that rotational drive force from the drive source has not been transmitted normally to the detection disk 16, and therefore, it can be said that the punch unit 8 did not connect correctly and is disconnected. If determined at step ST206 that the punch unit 8 is disconnected, a warning is issued to the manipulation unit not indicated in the diagram (ST206).

FIGS. 27A and 27B indicate when it can be determined that the punch unit 8 is connected and that paper remains inside the punch unit 8. Further, in FIGS. 27A and 27*b*, the same processing content as that in FIG. 26 is indicated by the same codes.

In FIGS. 27A and 27*b*, if judged that the drive time of motor 21 in step ST202 exceeded the fixed time, it is determined whether or not the cutaway part 16*a* of the detection disk 16 has been detected in the fixed time (ST207), and if not detected, it is judged that the punch unit 8 is disconnected (ST206).

Meanwhile, if the cutaway part 16*a* of the detection disk 16 is detected at step ST207, the servo motor 21 is rotated in reverse (ST208). In this case, rotational drive force is being transmitted to the detection disk 16 because the cutaway part 16*a* of the detection disk 16 was detected, that is, it can be determined that the punch unit 8 is connected normally, but because the cutaway part 16*a* has not passed through and beyond the home position sensor 18, it can be judged that paper remains in the punch unit 8 such that the punch blades 27 cannot penetrate thick paper and the like; and a warning about this situation is issued. The conditions inside the punch unit 8 during replacement can thereby be automatically recognized when determining the punch unit 8 connection status, even without the user being aware.

Moreover, in addition to determining the cutaway part detection status from the detection disk 16 when the motor is rotating in reverse as indicated in FIGS. 27A and 27B, the processing indicated in FIGS. 28A and 28B can be conducted to determine if paper is remaining in the punch unit 8.

In FIGS. 28A and 28B, if in the processing of step ST202 the drive time of the servo motor 21 does not pass in a fixed time, the servo motor 21 is switched to reverse, and is continued a fixed time (ST208, 209).

The system determines whether or not the reverse rotation time of the servo motor 21 has reached the fixed time (ST210), and if the home position sensor 18 detects the cutaway part 16*a* of the detection disk 16 in this interval (ST211), it is judged that the rotational drive force is being transmitted to the detection disk, and it is determined that the punch blades 27 cannot correctly protrude from the punch upper guide plate 28 (refer to FIG. 7), specifically, that the passage of the punch blades 27 is blocked by thick paper and the like; and a warning about paper remaining in the punch unit 8 is issued (ST212), and connection of the punch unit 8 is confirmed (ST204), and the servo motor 21 is stopped (ST205).

Meanwhile, if the reverse rotation drive time after switching to reverse rotation does not pass in a fixed time, specifically, if a signal from the home position sensor 18 cannot be detected, it is determined that rotational drive force is not being transmitted to the detection disk 16, and a warning is issued to confirm that punch unit 8 is not connected (ST206).

According to the embodiment described above, the mounting status of the punch unit 8 during replacement, and the settings for the initial conditions are not determined by the user during replacement, and therefore setting mistakes prone to occur when the user does determine these can be avoided in advance.

Moreover, it can automatically be judged if the signals to determine a disconnected state are based on an original disconnection, or whether the cause is that paper is remaining in the punch unit 8, and therefore, the labor involved for the user to investigate the cause can be saved.

The effects described above can be obtained by the present invention (1) Because a perforation device comprising a punch used in perforation can be replaced by inserting into and detaching from a support unit of a drive device to drive this, specifically, a device to drive a perforation device in a direction at a right angle to the direction of sheet material movement, sharing is possible even if a drive device targeting the perforation device is not provided for every perforation device. Moreover, by being able to selectively join and match perforation device, a perforation device can easily be selected corresponding to the number of holes and the hole positions. In addition, the drive device portion that does need to be mounted in every perforation device to be replaced can reduce the structural costs such as the parts costs and the processing costs of the perforation device.

(2) Improvement of replacement operability is possible because the perforation device can be mounted on the base of a carriage structure and move in the lateral registration direction above the support unit, and when mounting in the base unit can be integrated with the base unit just by simple mating and securing operations. Moreover, because the base part mounting position can be determined by a correlative relationship with the desired position detection device arranged on the support unit side, the mounting position can be accurately set, and position determination of the desired position of the perforation device can be easily conducted by the user implementing the replacement operation without relying on a specialist like a service technician.

(3) The punch setup status of the replaced perforation device can be determined and the perforation operation can be controlled because a detection disk on which a cutaway is formed on one part of the circumferential direction is provided on the rotational spindle of an eccentric cam contacting a punch raising and lowering bracket on which the perforation device has been mounted, because a detection device that can detect the cutaway corresponding thereto is provided, and because whether the initial conditions exist to begin perforation can be determined by detecting the position of the cutaway using a detection device,.

(4) Because the cutaway formed in the detection disk corresponds to the perforation contents of the perforation device, the perforation start up status can be understood based on the perforation contents of every replaced perforation device, and user knowledge of the perforation start up conditions is not necessary.

(5) Because a cutaway of a shape different from the cutaway for determining the initial conditions to start perforation is provided on the detection disk, and because that shape can identify information relating to the number of holes and the hole positions, reduction of operational mistakes and the 6operational burden on the user is possible by making unnecessary any input operations by the user to set the perforation conditions of the replaced perforation device.

(6) Because a control unit is provided, connected to which is a detection device on the input side and a drive unit of the perforation device on the output side, and because the perforation conditions and position of the perforation device can be set corresponding to the detection results of the detection device, setting the perforation conditions after the replaced perforation device has been installed can be conducted automatically by the control unit side without depending on the user.

(7) Because, when detecting the detection disk cutaway, the speed is set to the speed of the detection disk or less at the time of perforation, if the member used in drive transmission adopts a meshing structure, meshing can be easily conducted, and detection errors can be minimized when detecting the detection disk cutaway.

(8) Because a new information acquisition operation, specifically, an operation to detect the cutaway again, cannot be conducted after the detection disk cutaway has been detected until the control device has discarded the perforation information obtained by detection, it is possible to prevent excessive acquisition data by repeated cutaway detection while the correlative relation between the detection disk and the detection device is broken down by removing the perforation device; and reduction of the perforation operation caused by a drop in speed at the time of the detection operation can be prevented.

(9) That the setup conditions of the replaced perforation device are inadequate can be easily recognized because a warning can be issued by the control unit if the detection disk cutaway cannot be detected.

(10) Because mutually disengageable drive transmission devices are provided on the perforation device side and the support unit side, and engagement by self-applied energization is possible if the correlative shapes agree when this drive transmission device is set to low speed set during detection of the detection disk cutaway, the connection conditions of the drive transmission device with the replaced perforation device and the support unit side can be automatically set without the user.

(11) The perforation device can be easily setup corresponding to the perforation conditions because replacement with a perforation device corresponding to the perforation conditions as well as the setup status of the perforation device when replaced can be automatically determined by the perforation device, the support unit on the side that supports that device, and the control unit, without depending on the user.

(12) The user himself can execute the perforation operation corresponding to special order content without relying on a service technician or the like because a perforation device corresponding to the perforation conditions and settings can be set up during post-processing of an imaging output sheet, even if using special order content.

The present patent application claims priority under 35 U.S.C. §119 upon Japanese patent application No. 2005-2248093, filed in the Japan Patent Office on Aug. 29, 2005, the contents and disclosure of which is hereby incorporated by reference in its entirety.

Various modifications will become possible for those skilled in the art after receiving the teachings of the present disclosure without departing from the scope thereof.

What is claimed is:

1. A perforating apparatus for conducting perforation processing on sheet material received from an image forming apparatus, comprising:

a perforation device including a punch configured to punch holes on said sheet material;

a detection disk having at least one cutaway part, the detection disk being rotatably mounted at one end of the perforation device;

a first drive motor fixedly mounted on a stay and in axial alignment with the perforation device for driving said perforation device to conduct said perforation processing on said sheet material;

a base, having a plurality of rollers, fixedly mounted on the perforating apparatus, the perforation device being insertable into the stay and configured to move lengthwise on the stay; and a home position sensor mounted on the base, wherein said perforation device is axially insertable into and detachable from said first drive motor such that a first end of a rotational spindle of the perforation device is directly contactable with the first drive motor fixed to a non-moving part of the perforation device, and the home position sensor is positioned below the detection disk when the perforation device is operably engaged with the first drive motor.

2. The perforation apparatus according to claim 1, further comprising a second drive motor, attached to the first drive motor, for driving said perforation device to be positionally adjusted in a width direction of said sheet material to adjust lateral registration of the perforation device relative to the sheet material, wherein said perforation device is insertable into and detachable from said first and second drive motors.

3. The perforating apparatus according to claim 2, wherein said perforation device is positionally adjusted by said second drive motor in a direction at a right angle to a direction of movement of said sheet material, and is inserted into and detached from a non-moving part of the perforating apparatus where said second drive motor is installed.

4. The perforating apparatus according to claim 3, wherein a first ratchet-shaped cam member is provided on the perforation device and a second ratchet-shaped cam member is provided on the first drive motor, and wherein drive force from the first drive motor is transmitted to the second ratchet-shaped cam member when the cam members are engaged with each other.

5. The perforating apparatus according to claim 2, wherein the second drive motor is mounted on the stay.

6. The perforating apparatus according to claim 2, wherein the perforation device includes a first ratchet-shaped member on an end of the perforation device and the first drive motor includes a second ratchet-shaped member positioned to engage the first ratchet-shaped member when the perforation device is attached to the first drive motor and the second drive motor.

7. The perforating apparatus according to claim 2, wherein the perforation device is received in the stay when the perforation device is attached to the first drive motor and the second drive motor.

8. The perforating apparatus according to claim 7, further comprising a bracket on which the first drive motor and the second drive motor are mounted.

9. The perforating apparatus according to claim 8, wherein the stay extends from the bracket in a direction parallel to the perforation device.

10. The perforating apparatus according to claim 9, wherein the perforation device includes at least one rail configured to be received in the stay to mount the perforation device to the stay.

11. An image forming apparatus comprising a perforating apparatus that conducts perforating processing on sheet material received from the image forming apparatus, said perforation apparatus comprising:

a perforation device including a punch configured to punch holes on said sheet material;

a detection disk having at least one cutaway part, the detection disk being rotatably mounted at one end of the perforation device;

a first drive motor fixedly mounted on a stay and connectable to an axial end of the perforation device for driving said perforation device to conduct said perforation processing on said sheet material;

a base, having a plurality of rollers, fixedly mounted on the perforating apparatus, the perforation device being insertable into the stay and configured to move lengthwise on the stay;

a home position sensor mounted on the base; and a controller configured to adjust a position of the perforation device in a lateral registration direction based on a signal output from the home position sensor corresponding to at least one of an amount of cutaway parts and a position of the cutaway parts on the detection disk, wherein said perforation device is integrally insertable into and detachable from said first drive motor such that a first end of a rotational spindle of the perforation device is directly contactable with the first drive motor fixed to a non-moving part of the perforation device.

12. The image forming apparatus according to claim 11, wherein said perforation apparatus further comprises a second drive motor, fixed to the first drive motor, for driving said perforation device to be positionally adjusted in a width direction of said sheet material to adjust lateral registration of the perforation device relative to the sheet material, wherein said perforation device is insertable into and detachable from said first and second drive motors.

13. The image forming apparatus according to claim 12, wherein said perforation device is positionally adjusted by said second drive motor in a direction at a right angle to a direction of movement and said sheet material, and is inserted into and detached from a non-moving part of the perforating apparatus where said second drive motor is installed.

14. The image forming apparatus according to claim 13, wherein a first ratchet-shaped cam member is provided on the perforation device and a second ratchet-shaped cam member is provided on the first drive motor, and wherein drive force from the first drive device is transmitted to the second ratchet-shaped cam member when the cam members are engaged with each other.

15. The perforating apparatus according to claim 12, wherein the perforation device includes a first ratchet-shaped member on an end of the perforation device and the first drive motor includes a second ratchet-shaped member positioned to engage the first ratchet-shaped member when the perforation device is attached to the first drive motor and the second drive motor.

16. The perforating apparatus according to claim 12, wherein the perforation device is received in the stay when the perforation device is attached to the first drive motor and the second drive motor.

17. The perforating apparatus according to claim 16, further comprising a bracket on which the first drive motor and the second drive motor are mounted.

18. The perforating apparatus according to claim 17, wherein the stay extends from the bracket in a direction parallel to the perforation device.

19. The perforating apparatus according to claim 18, wherein the perforation device include at least one rail configured to be received in the stay to mount the perforation device to the stay.

* * * * *